US008583842B2

(12) United States Patent
Sugiyama et al.

(10) Patent No.: US 8,583,842 B2
(45) Date of Patent: Nov. 12, 2013

(54) DATA TRANSFER DEVICE AND DATA TRANSFER SYSTEM

(75) Inventors: Shigetoshi Sugiyama, Kanagawa (JP); Takeshi Shimoyama, Tokyo (JP)

(73) Assignee: Sony Corporation (JP)

( * ) Notice: Subject to any disclaimer, the term of this patent is extended or adjusted under 35 U.S.C. 154(b) by 1057 days.

(21) Appl. No.: 11/724,056

(22) Filed: Mar. 14, 2007

(65) Prior Publication Data

US 2007/0233921 A1    Oct. 4, 2007

(30) Foreign Application Priority Data

Mar. 16, 2006 (JP) ................ P2006-073096

(51) Int. Cl.
*G06F 13/00* (2006.01)
(52) U.S. Cl.
USPC ............................. 710/110; 112/52; 112/29
(58) Field of Classification Search
USPC ................ 710/110, 100, 105, 112, 52, 29; 370/242
See application file for complete search history.

(56) References Cited

U.S. PATENT DOCUMENTS

| | | | | |
|---|---|---|---|---|
| 5,546,546 A | * | 8/1996 | Bell et al. | 710/112 |
| 5,630,172 A | | 5/1997 | Ami et al. | |
| 5,701,502 A | * | 12/1997 | Baker et al. | 709/201 |
| 5,854,906 A | * | 12/1998 | Van Loo | 710/110 |
| 6,260,174 B1 | * | 7/2001 | Van Loo | 714/811 |
| 6,662,306 B2 | * | 12/2003 | Van Loo | 713/600 |
| 7,000,060 B2 | * | 2/2006 | Shah et al. | 710/310 |

FOREIGN PATENT DOCUMENTS

| | | |
|---|---|---|
| EP | 1 059 588 | 12/2000 |
| JP | 63298434 A | 12/1988 |
| JP | 04180340 A | 6/1992 |
| JP | 11073278 A | 3/1999 |
| JP | 2001-175588 A | 6/2001 |
| JP | 2001-188749 A | 7/2001 |
| JP | 2001202327 A | 7/2001 |

OTHER PUBLICATIONS

Citrix. Operations Guide: Monitoring. White Paper. 2012.*
Trexon Inc. Modbus Protocol. Jan. 2000.*
Altera. Avalon Interface. Specifications. May 2013.*
Office Action from Japanese Application No. 2006-073096, dated May 6, 2010.

* cited by examiner

*Primary Examiner* — Matthew D Spittle
(74) *Attorney, Agent, or Firm* — Lerner, David, Littenberg, Krumholz & Mentlik, LLP

(57) ABSTRACT

Disclosed herein is a data transfer device to which a master device that issues transfer requests and slave devices each having a function of responding to the transfer request may be connected. The device may include a transfer request counter that counts up or down each time a response signal is inputted thereto from any slave device, and counts down or up each time a data transfer completion signal is inputted thereto; a transfer destination selector that, based on a count value of the counter and information concerning a transfer-target slave device, determines and selects one of the slave devices as a destination of the transfer request, and connects the master device with the selected slave device; and a data transfer monitoring section that monitors completion of data transfer corresponding to the transfer request and, upon recognizing the completion, outputs the data transfer completion signal to the counter.

9 Claims, 21 Drawing Sheets

DATA TRANSFER DEVICE AND DATA TRANSFER SYSTEM

CROSS-REFERENCE TO RELATED APPLICATIONS

This application claims priority from Japanese Patent Application No. JP 2006-073096, filed in the Japanese Patent Office on Mar. 16, 2006, the entire content of which is incorporated herein by reference.

BACKGROUND OF THE INVENTION

1. Field of the Invention

The present invention relates to a data transfer device and a data transfer system which ensure data transfer between a master device capable of outputting a plurality of transfer requests and a plurality of slave devices such as memories.

2. Description of the Related Art

Suppose that when transferring data between the master device that outputs the transfer requests and the slave devices, the order in which the data are transferred should be maintained. In this case, the master device generally outputs one transfer request and, after the corresponding transfer is completed, outputs the next transfer request.

In the above case, the order of responses is maintained although there are a plurality of slaves to which the transfer requests are outputted, but it is difficult to increase the efficiency in data transfer.

As such, there are techniques of outputting the plurality of transfer requests in advance in order to increase the efficiency in data transfer.

As systems (methods) in which the master device outputs the transfer requests to the plurality of slave devices in advance, there are known systems (methods) as described below.

In a first system (method), the master device issues the transfer requests with an appropriate pause(s), paying attention to the target slave devices.

In a second system, the master device has an internal buffer of sufficient size and a control capability and is designed to be able to successfully operate regardless of the order of the responses.

In a third system, a bridge that is capable of storing the order of the transfer requests and has a data buffer of sufficient size is used to ensure the order of the responses.

Japanese Patent Laid-open No. 2001-175588 describes a bus controller that has inside it a master queue and a slave queue separately and manages the queues separately using a master queue managing section and a slave queue managing section.

Japanese Patent Laid-open No. 2001-188749 describes a bus controller that carries out access control regarding the plurality of slave devices based on a request from the master device. This bus controller determines whether a slave device indicated by an address of an access request from the master device is the same as a slave device that is currently being accessed, and determines a time to start accessing the slave device based on the access request from the master device.

SUMMARY OF THE INVENTION

The above-described first and second systems have a problem in that a master device that is not designed to have the function of issuing the transfer requests with an appropriate pause, paying attention to the target slave devices, or to have the internal buffer of sufficient size and the control capability needs a change in circuitry.

The above-described third system has a disadvantage in that depending on the amount of transferred data and the number of target slaves, the size of the buffer contained in the bridge may become very large.

The bus controller as described in Japanese Patent Laid-open No. 2001-175588 has a disadvantage in that the need to have inside it the master queue and the slave queue and manage the queues separately on the master side and on the slave side leads to complicated control.

The bus controller as described in Japanese Patent Laid-open No. 2001-188749 has a disadvantage in that, although the access control regarding the slave devices is achieved without the need for a large buffer, only up to two transfer requests can be dealt with for one slave as the bus controller has access flags and slave flags in two stages.

According to embodiments of the present invention, it is desirable to provide a data transfer device and a data transfer system which realize a process involving three or more transfer requests by simple control, without the need for a change in circuitry or a large buffer.

According to one embodiment of the present invention, there is provided a data transfer device to which a master device capable of issuing a plurality of transfer requests and a plurality of slave devices each having a function of responding to the transfer request are connected, the data transfer device may include a transfer request counter configured to count up or count down each time a response signal responding to the transfer request issued from the master device is inputted thereto from any one of the plurality of slave devices, and count down or count up each time a data transfer completion signal is inputted thereto; a transfer destination selector configured to, based on a count value of the transfer request counter and information concerning a transfer-target slave device, determine and select one of the plurality of slave devices as a destination of the transfer request, and connect the master device with the selected slave device to enable data transfer therebetween; and a data transfer monitoring section configured to monitor completion of data transfer corresponding to the transfer request issued by the master device and, upon recognizing the completion thereof, output the data transfer completion signal to the transfer request counter.

According to another embodiment of the present invention, there is provided a data transfer system which may include a master device capable of issuing a plurality of transfer requests; a plurality of slave devices each having a function of responding to the transfer request; and a data transfer device to which the master device and the plurality of slave devices are connected. The data transfer device may include a transfer request counter configured to count up or count down each time a response signal responding to the transfer request issued from the master device is inputted thereto from any one of the plurality of slave devices, and count down or count up each time a data transfer completion signal is inputted thereto; a transfer destination selector configured to, based on a count value of the transfer request counter and information concerning a current transfer-target slave device, determine and select one of the plurality of slave devices as a destination of the transfer request, and connect the master device with the selected slave device to enable data transfer therebetween; and a data transfer monitoring section configured to monitor completion of data transfer corresponding to the transfer request issued by the master device and, upon recognizing the completion thereof, output the data transfer completion signal to the transfer request counter.

According to yet another embodiment of the present invention, there is provided a data transfer system which may include a master device capable of issuing a plurality of transfer requests; a plurality of slave devices each having a function of responding to the transfer request and including a data storage section; and first and second data transfer devices to which the master device and the plurality of slave devices are connected. The plurality of transfer requests issued by the master device may each be either a request for reading and transferring data from the data storage section of one of the plurality of slave devices or a request for transferring data to one of the plurality of slave devices and writing the data to the data storage section of the slave device. Each of the first and second data transfer devices may include a transfer request counter configured to count up or count down each time a response signal responding to the transfer request issued from the master device is inputted thereto from any one of the plurality of slave devices, and count down or count up each time a data transfer completion signal is inputted thereto; a transfer destination selector configured to, based on a count value of the transfer request counter and information concerning a current transfer-target slave device, determine and select one of the plurality of slave devices as a destination of the transfer request, and connect the master device with the selected slave device to enable data transfer therebetween; and a data transfer monitoring section configured to monitor completion of data transfer corresponding to the transfer request issued by the master device and, upon recognizing the completion thereof, output the data transfer completion signal to the transfer request counter.

According to the above-described embodiments of the present invention, it may be possible to connect a functional block designed on the assumption that the responses are returned in the order of the transfer requests (i.e., a functional block designed without envisaging a case where the transfer requests are transferred to a plurality of slaves) with a plurality of slaves without the need to make a change in circuitry while maintaining the order of the responses.

Further, the master device may be able to issue the transfer requests in succession without regard to a response characteristic of any target slave.

Still further, since the successive issuance of the transfer requests is possible, the efficiency in data transfer for the same slave device is improved in the case where the slave device responds in the order of the transfer requests.

In addition, according to the above-described embodiments of the present invention, since an operation thereof may be achieved by control using only the transfer request signals, there may be no need to provide a large internal buffer or the like. That is, the operation is achieved by small-scale circuitry.

The above and other features and advantages of the present invention will become apparent from the following description when taken in conjunction with the accompanying drawings which illustrate preferred embodiments of the present invention by way of example.

DETAILED DESCRIPTION

Hereinafter, embodiments of the present invention will be described with reference to the accompanying drawings.

First Embodiment

Figure 1:
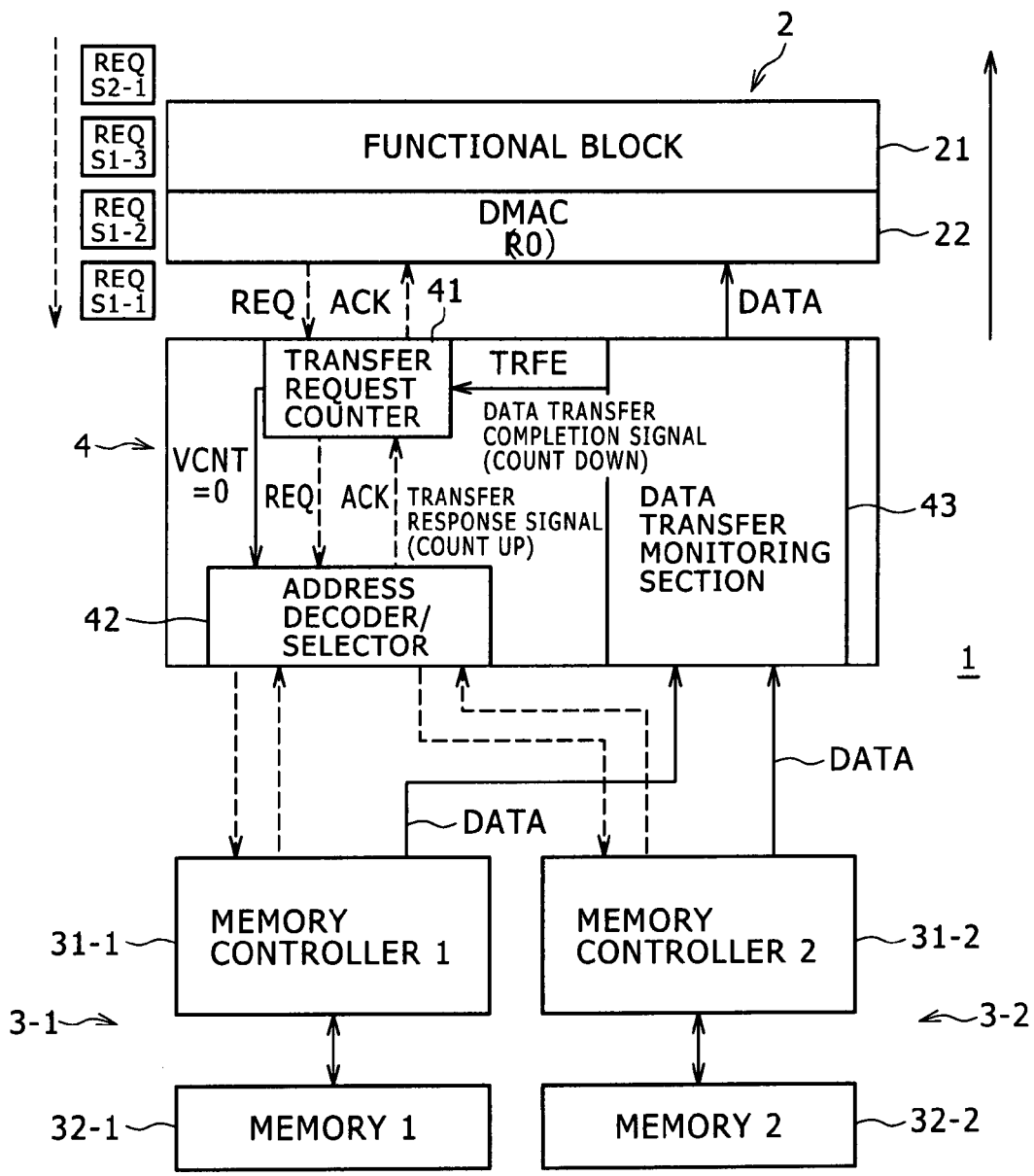
FIG. 1 is a diagram illustrating an exemplary configuration of a data transfer system according to a first embodiment of the present invention.

FIG. 1 is a diagram illustrating an exemplary configuration of a data transfer system according to a first embodiment of the present invention.

As illustrated in FIG. 1, a data transfer system 1 according to the present embodiment includes a master device 2, a plurality of (two, in this embodiment) slave devices 3-1 and 3-2, and a data transfer device (i.e., a bridge) 4.

The master device 2 is capable of outputting a plurality of transfer requests to improve efficiency in data transfer, and has a function of outputting transfer requests REQ to different destinations (i.e., slave devices). The master device 2 also has a function of processing data (hereinafter referred to also as "read data") read from the slave device 3-1 or the slave device 3-2.

That is, the data transfer system according to the present embodiment is of a "read type".

The master device 2 includes a functional block 21 and a DMAC (Direct Memory Access Controller) 22.

The functional block 21 performs a predetermined process on the read data transferred thereto from a memory of the slave device 3-1 or 3-2 via the data transfer device 4 in response to a transfer request from the DMAC 22.

The DMAC (R0) 22 has a function of controlling transaction of the requests REQ and responses ACK for reading of data stored in the memory of the slave device 3-1 or the slave device 3-2. The DMAC (R0) 22 also has a function of controlling transfer of the data to the functional block 21.

The slave device 3-1 includes a memory controller 31-1 and a memory 32-1. The memory 32-1 is formed by a DRAM, for example, and serves as a data storage section.

The memory controller 31-1 controls transfer, to the data transfer device 4, of a response to a data transfer request, which is a transaction control signal that is transferred in accordance with transfer mediation by the data transfer device 4. In accordance with various commands (e.g., a read command) that are transferred in accordance with the transfer mediation by the data transfer device 4, the memory controller 31-1 also controls access to the memory 32-1, and controls transfer of the read data to the data transfer device 4.

The slave device 3-2 includes a memory controller 31-2 and a memory 32-2. The memory 32-2 is formed by a DRAM, for example, and severs as a data storage section.

The memory controller 31-2 controls transfer, to the data transfer device 4, of a response to a data transfer request, which is a transaction control signal that is transferred in accordance with the transfer mediation by the data transfer device 4. In accordance with various commands (e.g., a read command) that are transferred in accordance with the transfer mediation by the data transfer device 4, the memory controller 31-2 also controls access to the memory 32-2, and controls transfer of the read data to the data transfer device 4.

Note that, in the present embodiment, the data storage sections of the slave devices 3-1 and 3-2 are memories by way of example. However, this may be any device that has a function of storing data. For example, a buffer may also serve as the data storage sections of the slave devices.

In the present embodiment, the DMAC 22 operates as a master while the memory controllers 31-1 and 31-2 operate as slaves. In the accompanying drawings, broken-line arrows indicate directions of the transfer of the transfer request signal (including a signal for specifying a slave device) REQ and the response signal ACK, whereas solid-line arrows indicate directions of the transfer of the data.

The data transfer device 4 has a function of, when the master device 2, which is capable of outputting a plurality of transfer requests to improve the efficiency in data transfer, has outputted the transfer requests to different destinations, i.e., the plurality of slave devices 3-1 and 3-2, automatically dividing the transfer requests according to their destinations to ensure the order of the responses of data transfer.

As illustrated in FIG. 1, the data transfer device 4 includes a transfer request counter 41, an address decoder/selector 42 as a transfer destination selector, and a data transfer monitoring section 43.

The transfer request counter 41 counts up by one each time the response signal ACK is inputted thereto from the slave device 3-1 or the slave device 3-2 in response to the transfer request REQ from the DMAC 22 of the master device 2. The transfer request counter 41 counts down by one each time a data transfer completion signal TRFE is inputted thereto from the data transfer monitoring section 43.

Based on a count value VCNT of the transfer request counter 41 and information concerning a current transfer-target slave device (i.e., a slave device to which a previous transfer request was outputted), the address decoder/selector 42, as the transfer destination selector, determines and selects one of the plurality of slave devices 3-1 and 3-2 as the destination of the transfer request, and connects the master device 2 with the selected slave device 3-1 or 3-2.

The address decoder/selector 42 obtains the current count value VCNT from the transfer request counter 41. When the count value VCNT is the same as its predetermined initial value (e.g., "0"), the address decoder/selector 42 is able to select either of the slave devices 3-1 and 3-2. When the count value VCNT is other than 0, the address decoder/selector 42 is able to select only the current transfer-target slave device 3-1 or 3-2.

The reason why the address decoder/selector 42 is denoted as such instead of simply as an "address selector" is that, in the system according to the present embodiment, a high-order bit of an address signal is used to specify the slave device.

The data transfer monitoring section 43 monitors completion of data transfer corresponding to the transfer request issued by the DMAC 22 of the master device 2. Upon recognizing the completion thereof, the data transfer monitoring section 43 outputs the data transfer completion signal TRFE to the transfer request counter 41.

Next, an operation of the first embodiment will now be described below with reference to FIGS. 1 to 9.

The following description is made with reference to an exemplary case where, as illustrated in FIG. 1, the master device 2 first outputs a transfer request signal "REQ:S1-1", then a transfer request signal "REQ:S1-2", then a transfer request signal "REQ:S1-3", and finally a transfer request signal "REQ:S2-1". The expression "REQ:S1" denotes a transfer request outputted to the slave device 3-1, while the expression "REQ:S2" denotes a transfer request outputted to the slave device 3-2. The numbers following the hyphen ("-") indicate an order in which the transfer requests are outputted to the same slave device.

In addition, in FIGS. 1 to 9, "DATA:S1-1" denotes "read data" to be read from the slave device 3-1, corresponding to the transfer request "REQ:S1-1"; "DATA:S1-2" denotes read data to be read from the slave device 3-1, corresponding to the transfer request "REQ:S1-2"; "DATA:S1-3", denotes read data to be read from the slave device 3-1, corresponding to the transfer request "REQ:S1-3"; and "DATA:S2-1" denotes read data to be read from the slave device 3-2, corresponding to the transfer request "REQ:S2-1".

Figure 2:
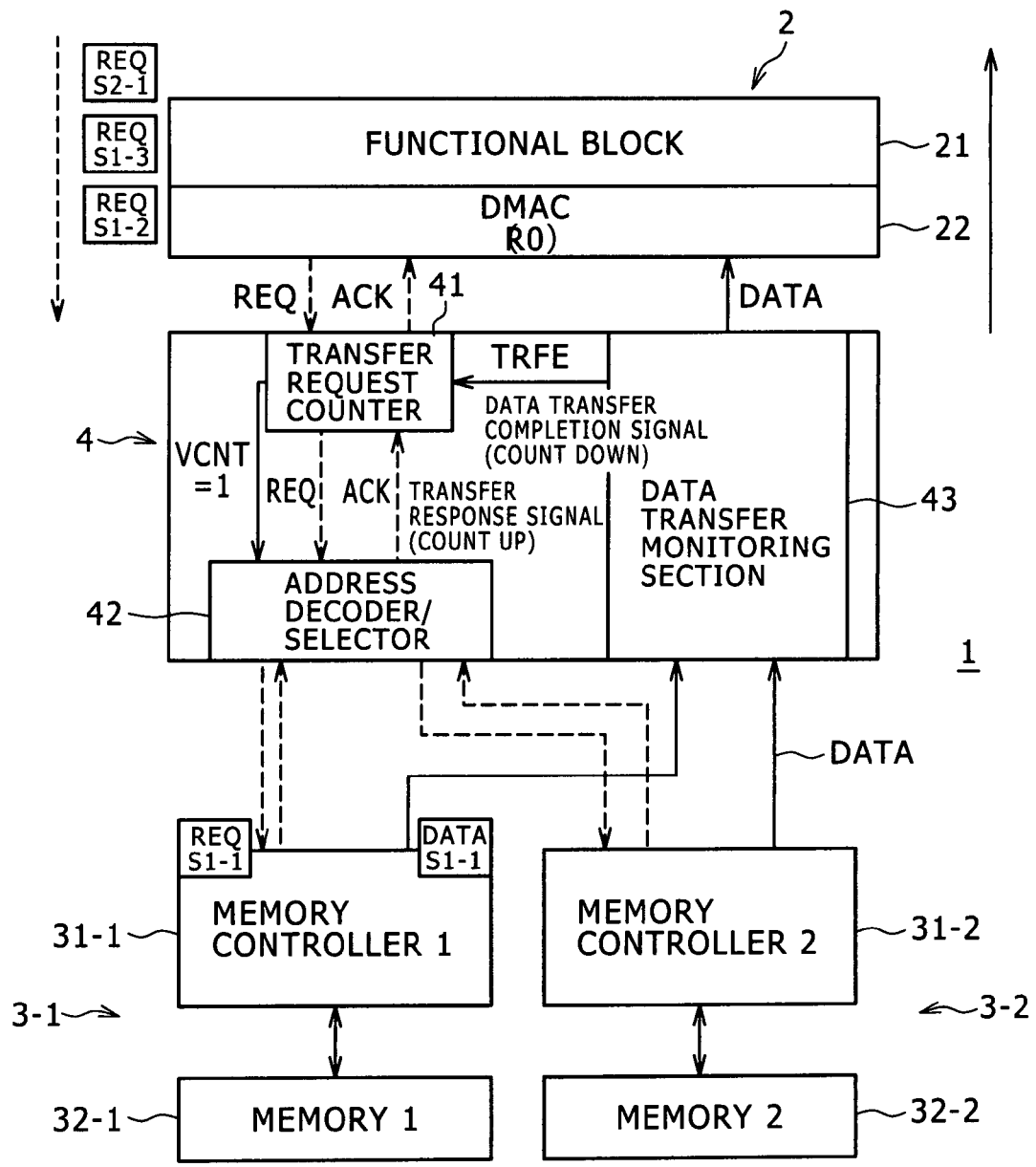
FIG. 2 is a diagram for explaining an operation of the first embodiment, illustrating a state in which a count value of a transfer request counter is 1.
Figure 3:
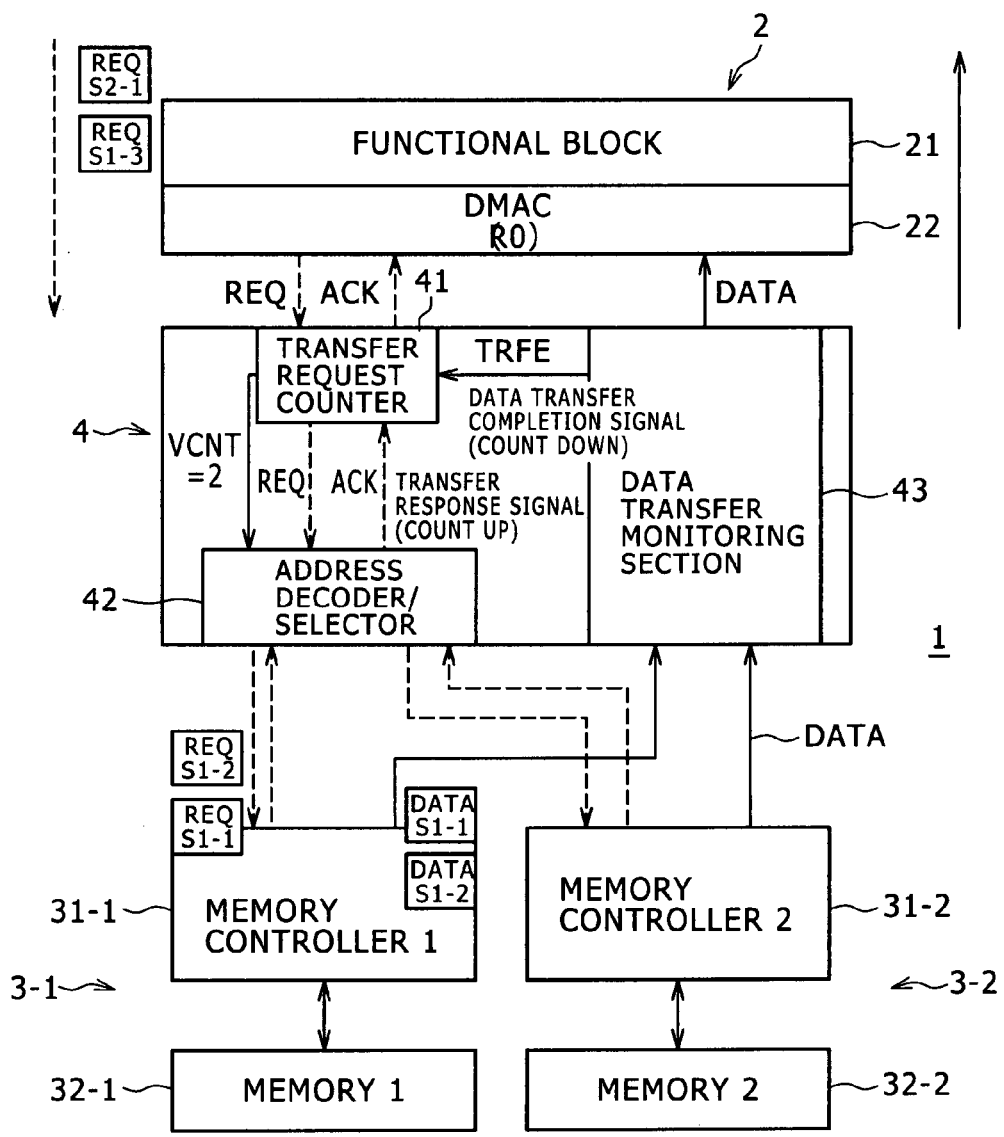
FIG. 3 is a diagram for explaining the operation of the first embodiment, illustrating a state in which the count value of the transfer request counter is 2.
Figure 4:
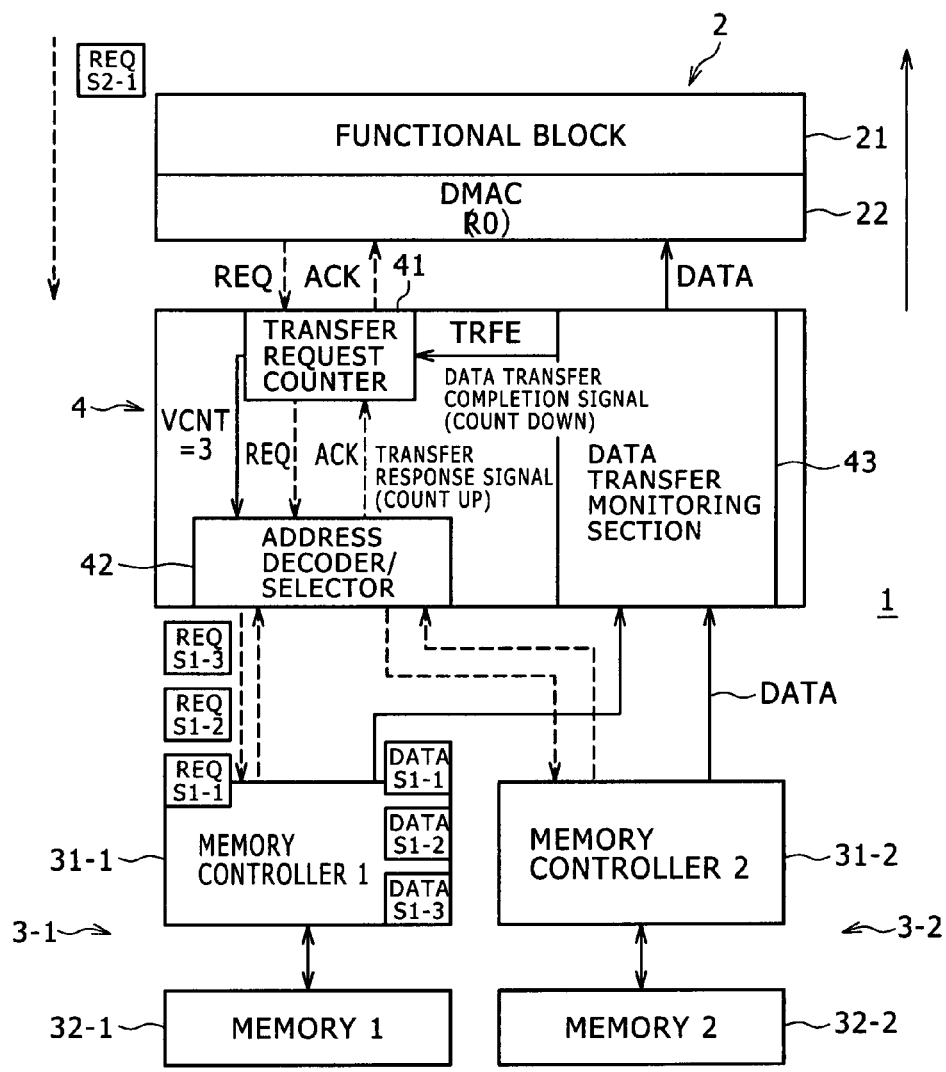
FIG. 4 is a diagram for explaining the operation of the first embodiment, illustrating a state in which the count value of the transfer request counter is 3.
Figure 5:
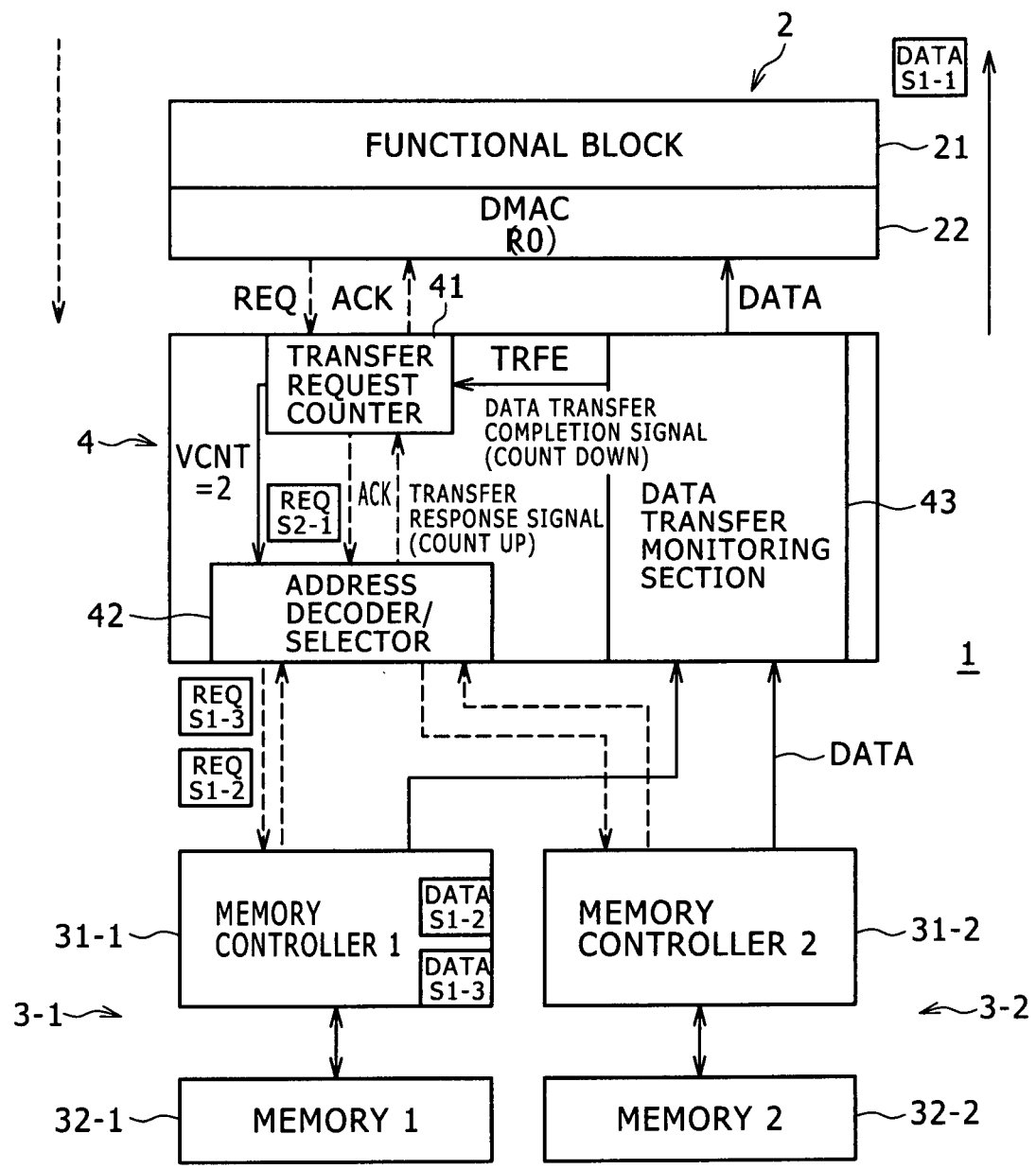
FIG. 5 is a diagram for explaining the operation of the first embodiment, illustrating a state in which the count value of the transfer request counter has decreased from 3 to 2.
Figure 6:
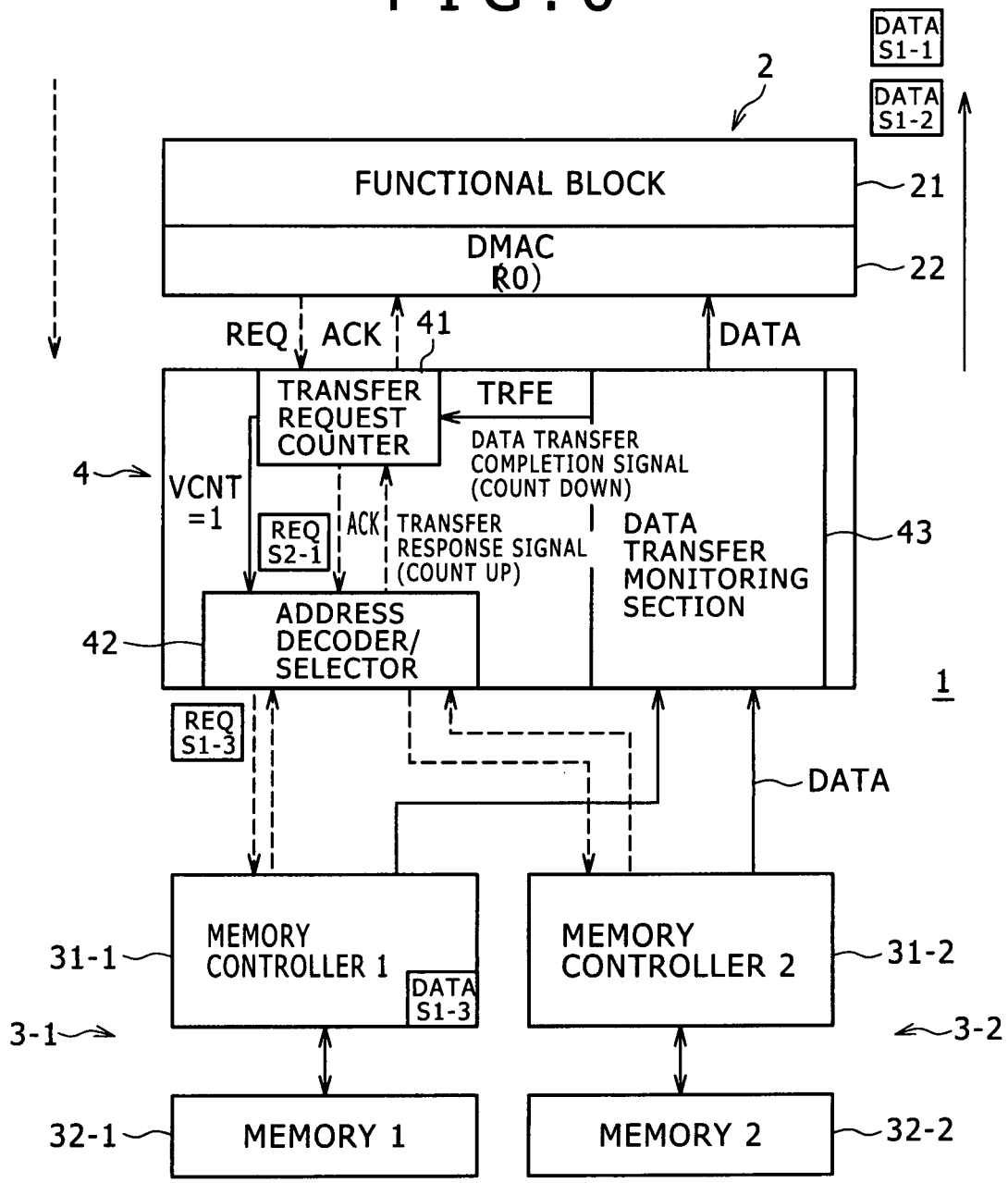
FIG. 6 is a diagram for explaining the operation of the first embodiment, illustrating a state in which the count value of the transfer request counter has decreased from 2 to 1.
Figure 7:
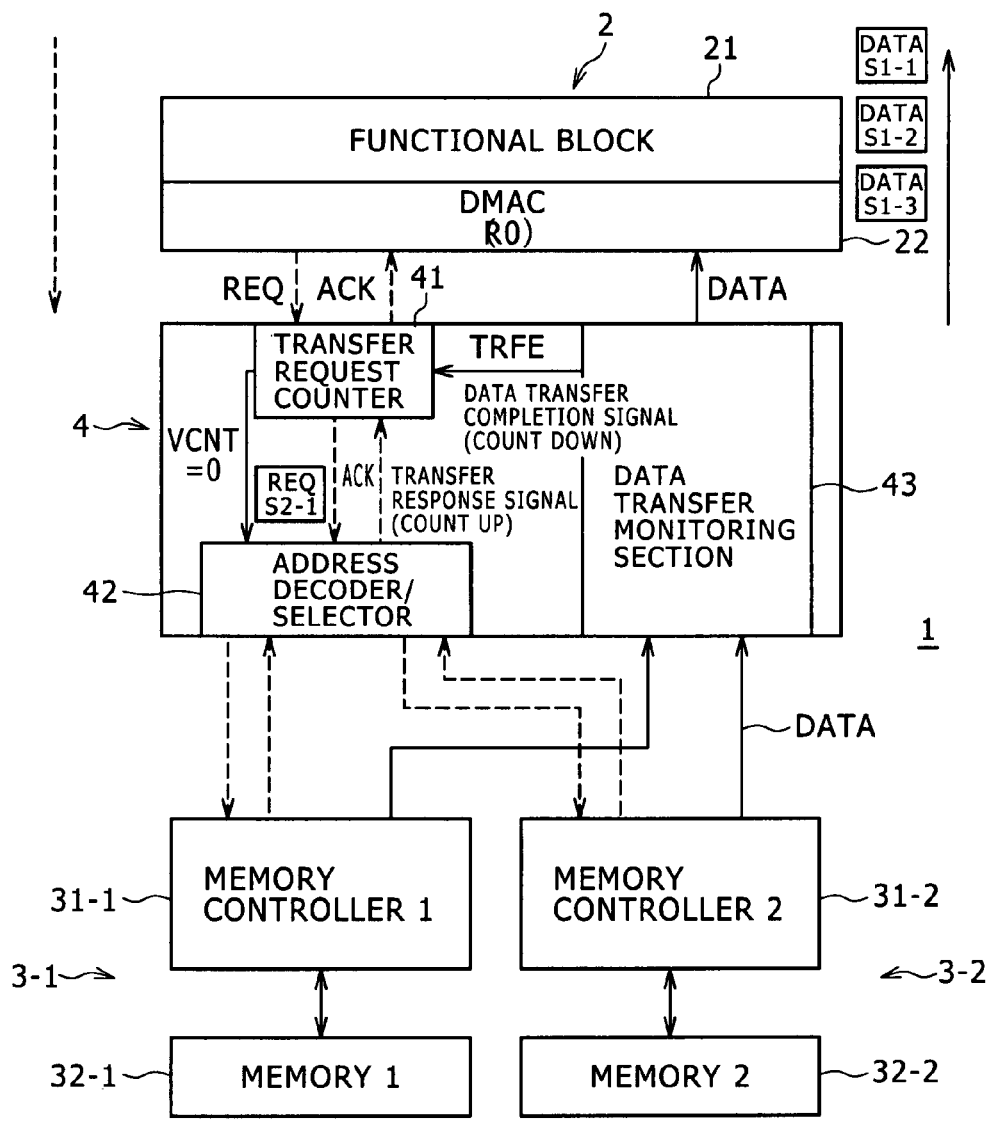
FIG. 7 is a diagram for explaining the operation of the first embodiment, illustrating a state in which the count value of the transfer request counter has decreased from 1 to 0.
Figure 8:
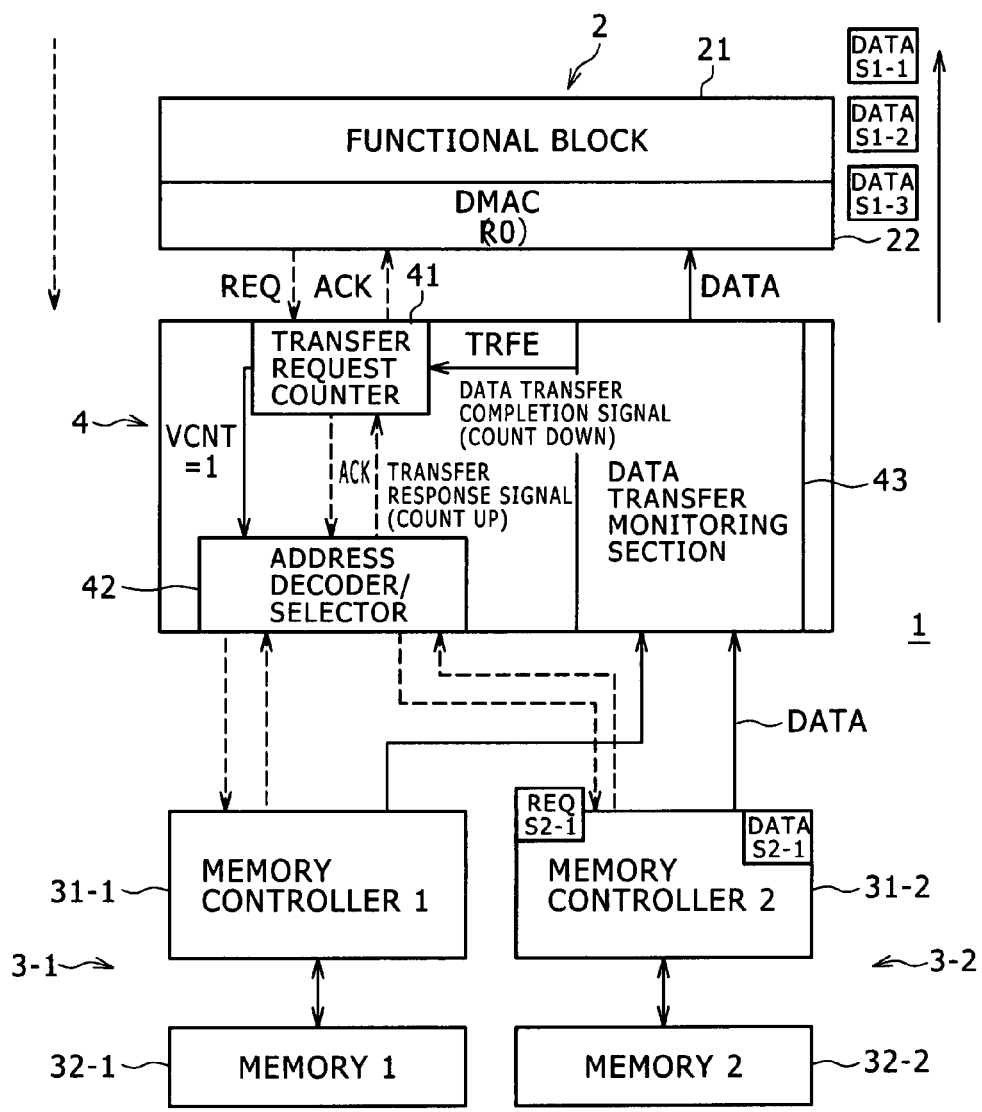
FIG. 8 is a diagram for explaining the operation of the first embodiment, illustrating a state in which the count value of the transfer request counter has increased from 0 to 1 as a result of output of a transfer request to a different slave device.
Figure 9:
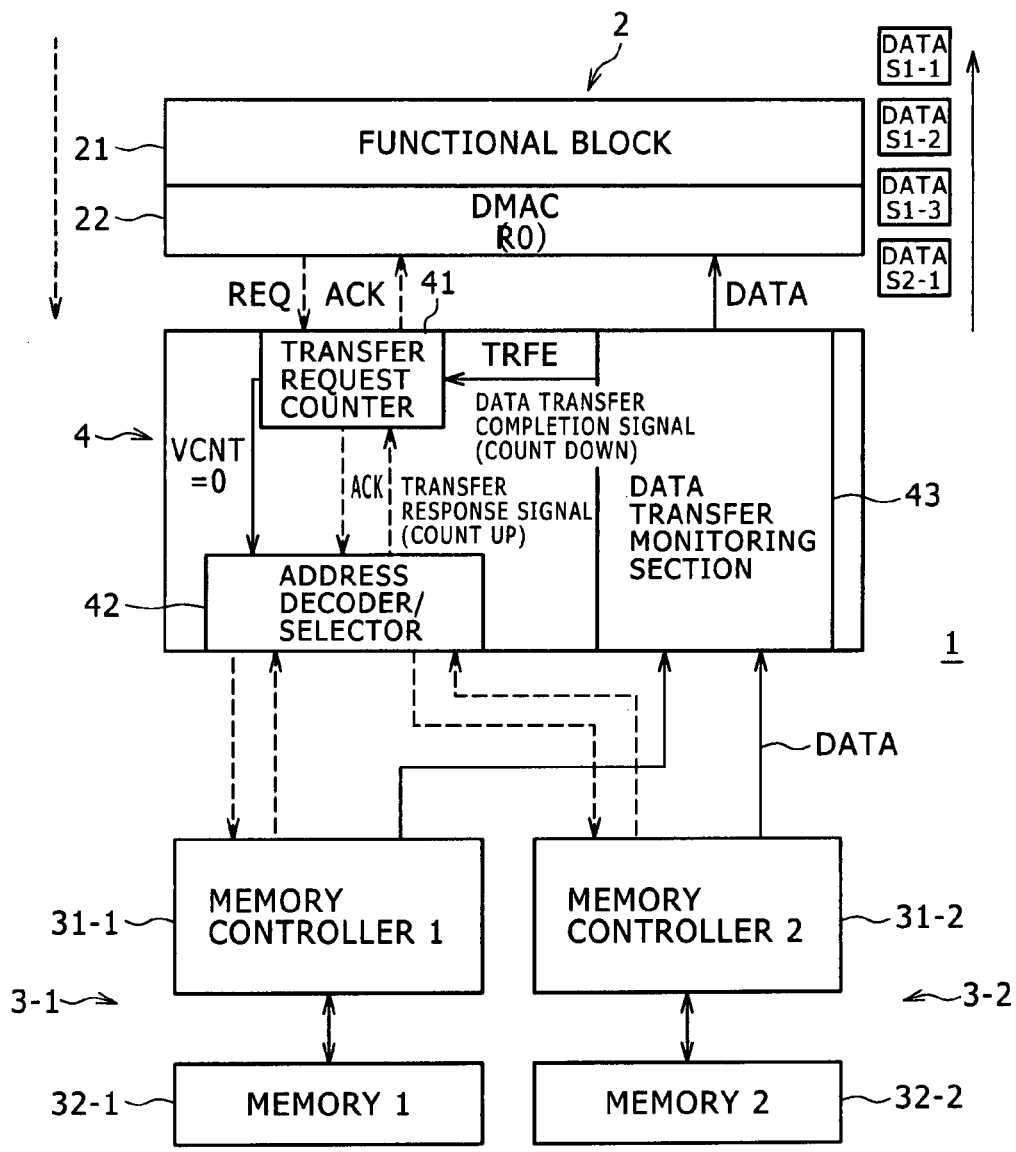
FIG. 9 is a diagram for explaining the operation of the first embodiment, illustrating a state in which the count value of the transfer request counter has decreased from 1 to 0.

FIG. 1 illustrates an initial state in which the count value VCNT of the transfer request counter 41 is 0. FIG. 2 illustrates a state in which the count value VCNT of the transfer request counter 41 is 1. FIG. 3 illustrates a state in which the count value VCNT of the transfer request counter 41 is 2. FIG. 4 illustrates a state in which the count value VCNT of the transfer request counter 41 is 3. FIG. 5 illustrates a state in which the count value VCNT of the transfer request counter 41 has decreased from 3 to 2. FIG. 6 illustrates a state in which the count value VCNT of the transfer request counter 41 has decreased from 2 to 1. FIG. 7 illustrates a state in which the count value VCNT of the transfer request counter 41 has decreased from 1 to 0. FIG. 8 illustrates a state in which the count value VCNT of the transfer request counter 41 has increased from 0 to 1 as a result of output of the transfer request to a different slave device. FIG. 9 illustrates a state in which the count value VCNT of the transfer request counter 41 has decreased from 1 to 0.

As illustrated in FIG. 1, the master device 2 outputs the transfer requests to the data transfer device 4 in the above-described order: "REQ:S1-1", then "REQ:S1-2", then "REQ:S1-3", and finally "REQ:S2-1".

At the time of issuance of the transfer request signal "REQ:S1-1", as the count value VCNT of the transfer request counter 41 is 0, the address decoder/selector 42 outputs the transfer request to the memory controller 31-1 of the slave device 3-1, and a transfer response is transferred from the memory controller 31-1 of the slave device 3-1 to the data transfer device 4.

At this time, in the data transfer device 4, the transfer response from the slave device 3-1 is inputted to the transfer request counter 41 via the address decoder/selector 42.

As a result, as illustrated in FIG. 2, the count value VCNT of the transfer request counter 41 becomes 1. In addition, the memory controller 31-1 accesses the memory 32-1 to read the data "DATA:S1-1" corresponding to the transfer request "REQ:S1-1" therefrom.

At the time of issuance of the transfer request signal "REQ:S1-2", the count value VCNT of the transfer request counter 41 is 1, but the destination of the transfer request to be outputted this time is the same as the destination of the previous transfer request, that is the slave device 3-1. Therefore, the address decoder/selector 42 outputs the transfer request to the memory controller 31-1 of the slave device 3-1, and the transfer response is transferred from the memory controller 31-1 of the slave device 3-1 to the data transfer device 4.

At this time, in the data transfer device 4, the transfer response from the slave device 3-1 is inputted to the transfer request counter 41 via the address decoder/selector 42.

As a result, as illustrated in FIG. 3, the count value VCNT of the transfer request counter 41 becomes 2. In addition, the memory controller 31-1 accesses the memory 32-1 to read the data "DATA:S1-2" corresponding to the transfer request "REQ:S1-2" therefrom.

At the time of issuance of the transfer request signal "REQ:S1-3", the count value VCNT of the transfer request counter 41 is 2, but the destination of the transfer request to be outputted this time is the same as the destination of the previous transfer request, that is the slave device 3-1. Therefore, the address decoder/selector 42 outputs the transfer request to the memory controller 31-1 of the slave device 3-1, and the transfer response is transferred from the memory controller 31-1 of the slave device 3-1 to the data transfer device 4.

At this time, in the data transfer device 4, the transfer response from the slave device 3-1 is inputted to the transfer request counter 41 via the address decoder/selector 42.

As a result, as illustrated in FIG. 4, the count value VCNT of the transfer request counter 41 becomes 3. In addition, the memory controller 31-1 accesses the memory 32-1 to read the data "DATA:S1-3" corresponding to the transfer request "REQ:S1-3" therefrom.

At the time of issuance of the transfer request signal "REQ:S2-1", the current count value VCNT of the transfer request counter 41 is not 0, and the destination of the transfer request to be outputted this time is the memory controller 31-2 of the slave device 3-2, which is different from the destination of the previous transfer request, that is the slave device 3-1. Therefore, as illustrated in FIG. 5, the transfer request signal "REQ:S2-1" is blocked by the address decoder/selector 42 from being outputted to the slave device 3-2.

As illustrated in FIG. 5, the read data "DATA:S1-1" corresponding to the transfer request signal "REQ:S1-1" is transferred from the memory controller 31-1 of the slave device 3-1 to the master device 2 via the data transfer monitoring section 43 of the data transfer device 4.

Upon completion of the data transfer to the master device 2, the data transfer completion signal TRFE is outputted from the data transfer monitoring section 43 to the transfer request counter 41. As a result, the count value VCNT of the transfer request counter 41 decreases by one, so that the count value VCNT becomes 2.

Similarly, as illustrated in FIG. 6, the read data "DATA:S1-2" corresponding to the transfer request signal "REQ:S1-2" is transferred from the memory controller 31-1 of the slave device 3-1 to the master device 2 via the data transfer monitoring section 43 of the data transfer device 4.

Upon completion of the data transfer to the master device 2, the data transfer completion signal TRFE is outputted from the data transfer monitoring section 43 to the transfer request counter 41. As a result, the count value VCNT of the transfer request counter 41 decreases by one, so that the count value VCNT becomes 1.

Similarly, as illustrated in FIG. 7, the read data "DATA:S1-3" corresponding to the transfer request signal "REQ:S1-3" is transferred from the memory controller 31-1 of the slave device 3-1 to the master device 2 via the data transfer monitoring section 43 of the data transfer device 4.

Upon completion of the data transfer to the master device 2, the data transfer completion signal TRFE is outputted from the data transfer monitoring section 43 to the transfer request counter 41. As a result, the count value VCNT of the transfer request counter 41 decreases by one, so that the count value VCNT becomes 0.

When, as illustrated in FIG. 7, the count value VCNT of the transfer request counter 41 of the data transfer device 4 becomes 0 as a result of the transfer of the read data "DATA:S1-3" from the memory controller 31-1 of the slave device 3-1 to the master device 2, the address decoder/selector 42 becomes able to select either of the slave devices 3-1 and 3-2. At this point, the transfer request signal "REQ:S2-1" is outputted to the memory controller 31-2 of the slave device 3-2.

Then, the transfer response is transferred from the memory controller 31-2 of the slave device 3-2 to the data transfer device 4.

At this time, in the data transfer device 4, the transfer response from the slave device 3-2 is inputted to the transfer request counter 41 via the address decoder/selector 42.

As a result, as illustrated in FIG. 8, the count value VCNT of the transfer request counter 41 becomes 1. In addition, the memory controller 31-2 accesses the memory 32-2 to read the data "DATA:S2-1" corresponding to the transfer request "REQ:S2-1" therefrom.

As illustrated in FIG. 9, the read data "DATA:S2-1" corresponding to the transfer request signal "REQ:S2-1" is transferred from the memory controller 31-2 of the slave device 3-2 to the master device 2 via the data transfer monitoring section 43 of the data transfer device 4.

Upon completion of the data transfer to the master device 2, the data transfer completion signal TRFE is outputted from the data transfer monitoring section 43 to the transfer request counter 41. As a result, the count value VCNT of the transfer request counter 41 decreases by one, so that the count value VCNT becomes 0.

The above-described operation enables the master to issue the transfer requests in succession without regard to any slave while maintaining the order of the transfer requests and the order of the data.

As described above, the data transfer device 4 according to the present embodiment includes: the transfer request counter 41 that counts up each time the response signal ACK is inputted thereto from the slave device 3-1 or the slave device 3-2 in response to the transfer request REQ from the DMAC 22 of the master device and which counts down each time the data transfer completion signal TRFE is inputted thereto from the data transfer monitoring section 43; the address decoder/selector 42 that determines and selects one of the slave devices 3-1 and 3-2 as the destination of the transfer request based on the count value of the transfer request counter 41 and the information concerning the current transfer-target slave device, and connects the master device 2 with the selected slave device 3-1 or 3-2; and the data transfer monitoring section 43 that monitors the completion of the data transfer corresponding to the transfer request from the DMAC 22 of the master device 2 and, upon recognizing the completion of the data transfer, outputs the transfer completion signal TRFE to the transfer request counter 41. Because of this, the following beneficial effects are achieved.

It is possible to connect a functional block designed on the assumption that the responses are returned in the order of the transfer requests (i.e., a functional block designed without envisaging a case where the transfer requests are transferred to a plurality of slaves) with a plurality of slaves without the need to make a change in circuitry while maintaining the order of the responses.

The master device is able to issue the transfer requests in succession without regard to a response characteristic of any target slave.

Since the successive issuance of the transfer requests is possible, the efficiency in data transfer for the same slave device is improved in the case where the slave device responds in the order of the transfer requests.

Since the above-described operation is achieved by control using only the transfer request signals, there is no need to provide a large internal buffer or the like. That is, the above-described operation is achieved by small-scale circuitry.

Second Embodiment

Figure 10:
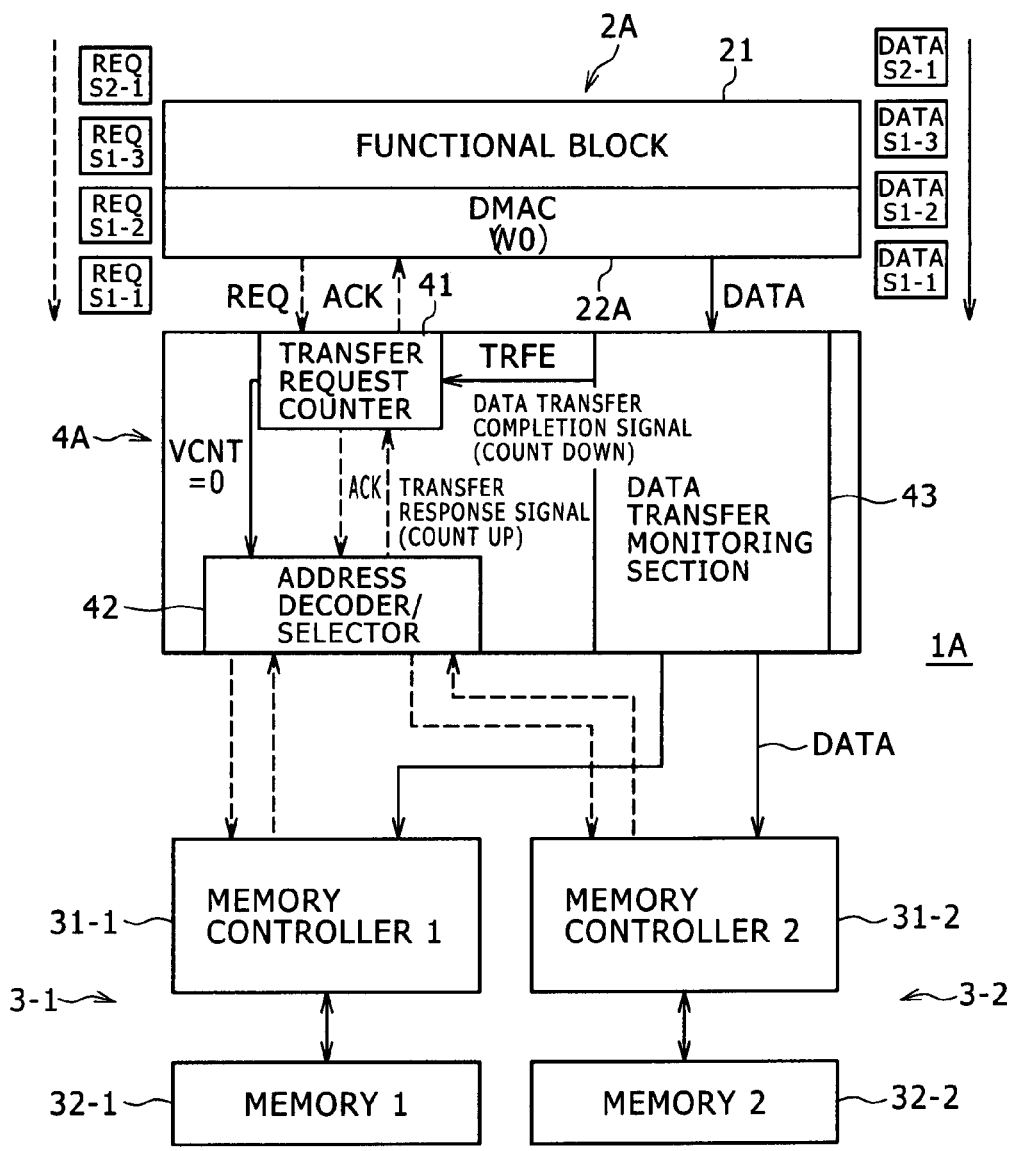
FIG. 10 is a diagram illustrating an exemplary configuration of a data transfer system according to a second embodiment of the present invention.

FIG. 10 is a diagram illustrating an exemplary configuration of a data transfer system according to a second embodiment of the present invention.

A data transfer system 1A according to the second embodiment is different from the data transfer system 1 according to the first embodiment in that the data transfer system 1A has a write-type circuit structure which is so constructed as to deal with not a reading operation but a writing operation.

Accordingly, a DMAC (W0) 22A of a master device 2A has a function of controlling transaction of requests REQ and responses ACK for writing of data to the memory 32-1 of the slave device 3-1 or the memory 32-2 of the slave device 3-2, and a function of controlling transfer of data from the functional block 21. This data may be data inputted to the functional block 21 from an outside or data generated by a given process.

In the other structural respects, the second embodiment is significantly the same as the first embodiment, and therefore, a detailed explanation thereof is omitted.

Next, an operation of the second embodiment will now be described below with reference to FIGS. 10 to 19.

The following description is made with reference to an exemplary case where, as illustrated in FIG. 10, the master device 2A first outputs the transfer request signal "REQ:S1-1", then the transfer request signal "REQ:S1-2", then the transfer request signal "REQ:S1-3", and finally the transfer request signal "REQ:S2-1". The expression "REQ:S1" denotes a transfer request outputted to the slave device 3-1, while the expression "REQ:S2" denotes a transfer request outputted to the slave device 3-2. The numbers following the hyphen ("-") indicate the order in which the transfer requests are outputted to the same slave device.

In addition, in FIGS. 10 to 19, "DATA:S1-1" denotes "write data" to be written to the slave device 3-1, corresponding to the transfer request "REQ:S1-1"; "DATA:S1-2" denotes write data to be written to the slave device 3-1, corresponding to the transfer request "REQ:S1-2"; "DATA:S1-3" denotes write data to be written to the slave device 3-1, corresponding to the transfer request "REQ:S1-3"; and "DATA:S2-1" denotes write data to be written to the slave device 3-2, corresponding to the transfer request "REQ:S2-1".

Figure 11:
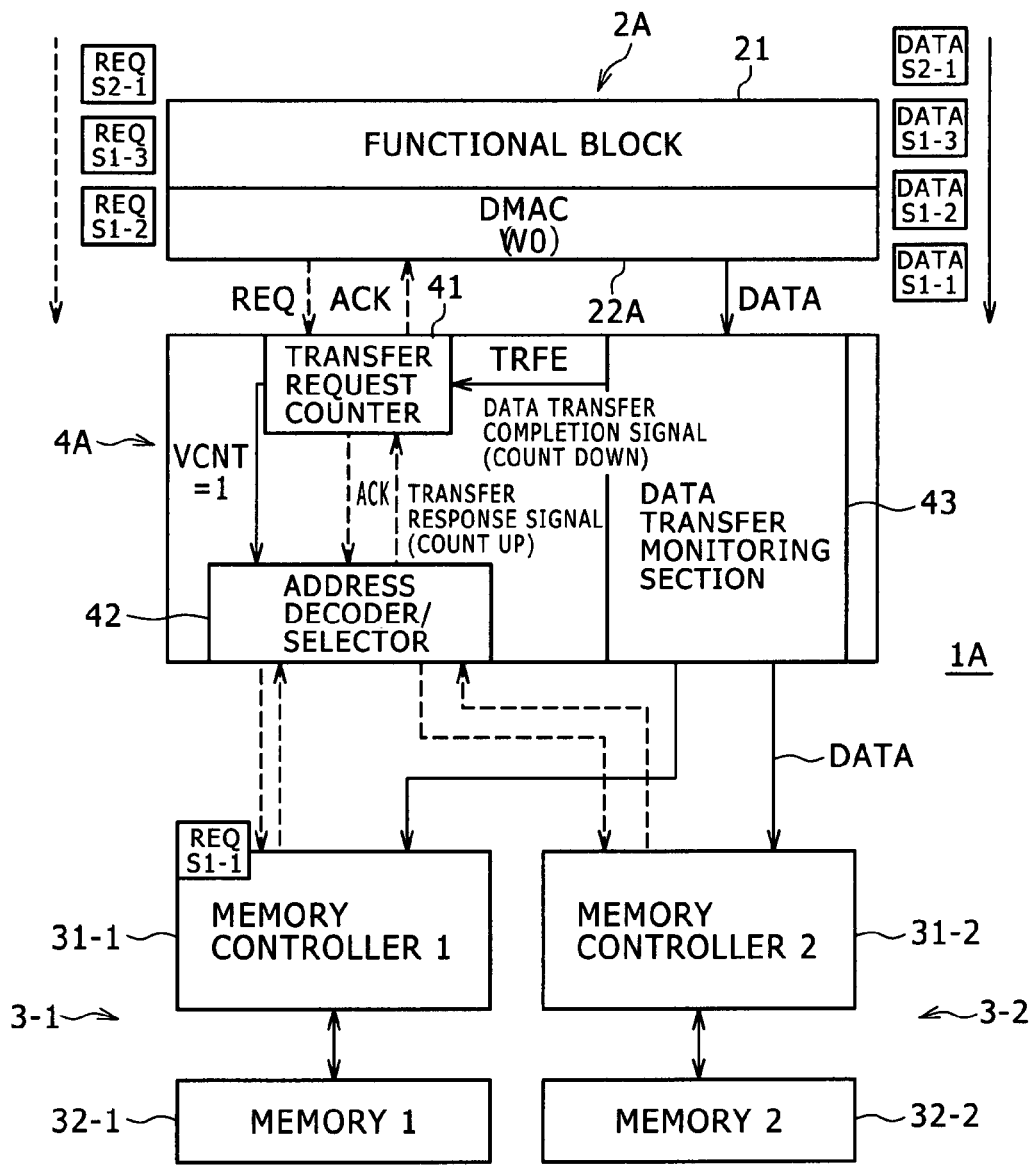
FIG. 11 is a diagram for explaining an operation of the second embodiment, illustrating a state in which the count value of the transfer request counter is 1.
Figure 12:
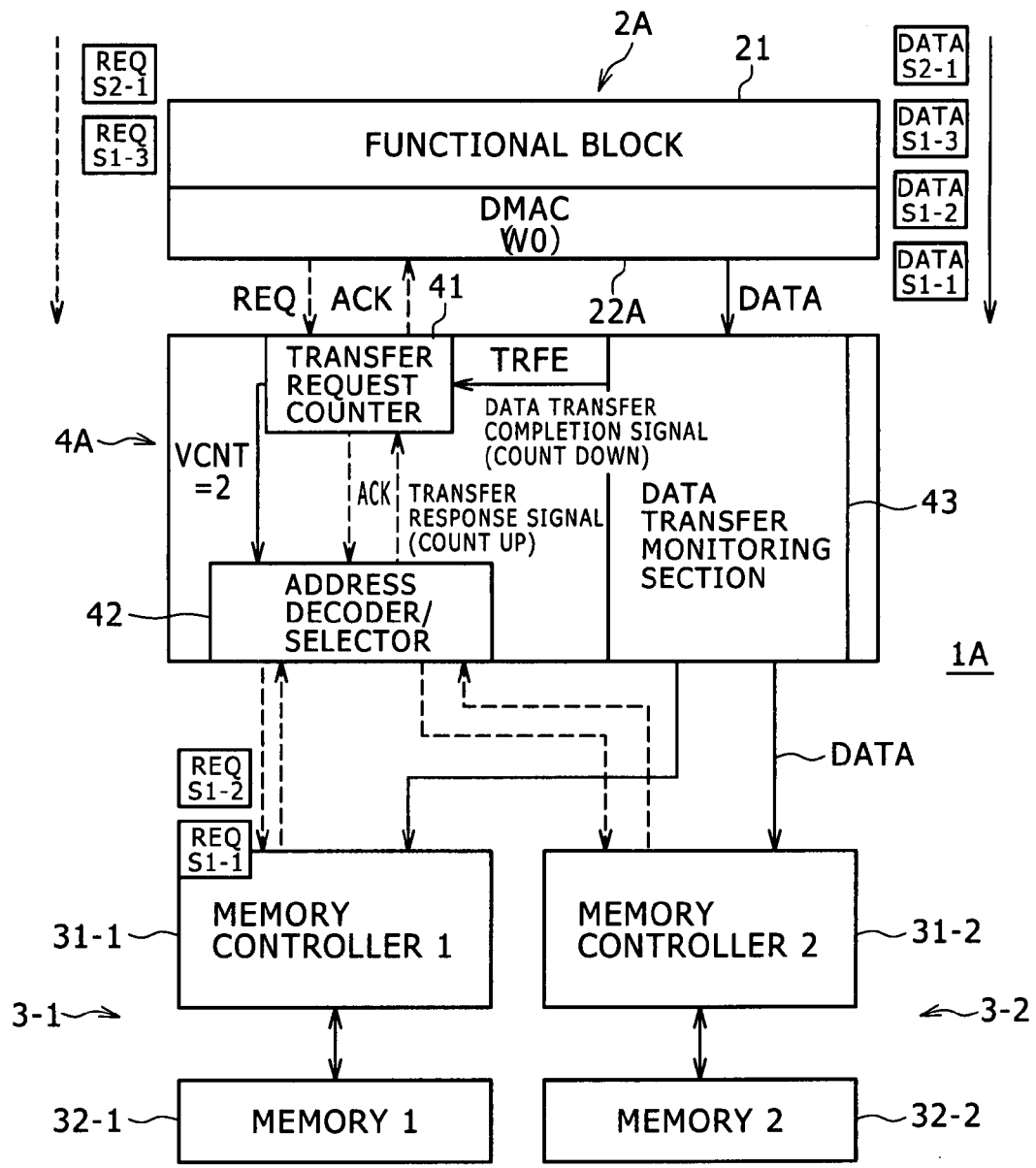
FIG. 12 is a diagram for explaining the operation of the second embodiment, illustrating a state in which the count value of the transfer request counter is 2.
Figure 13:
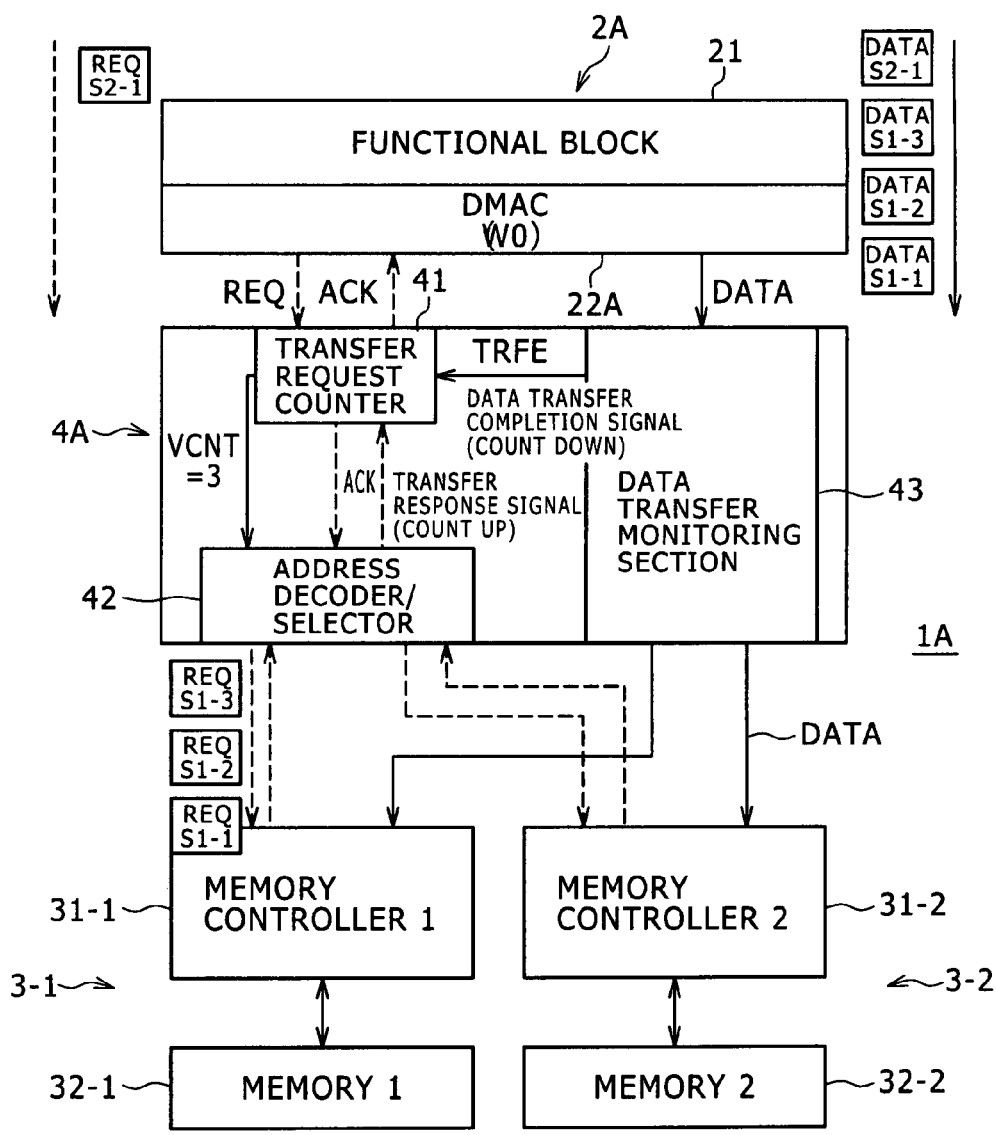
FIG. 13 is a diagram for explaining the operation of the second embodiment, illustrating a state in which the count value of the transfer request counter is 3.
Figure 14:
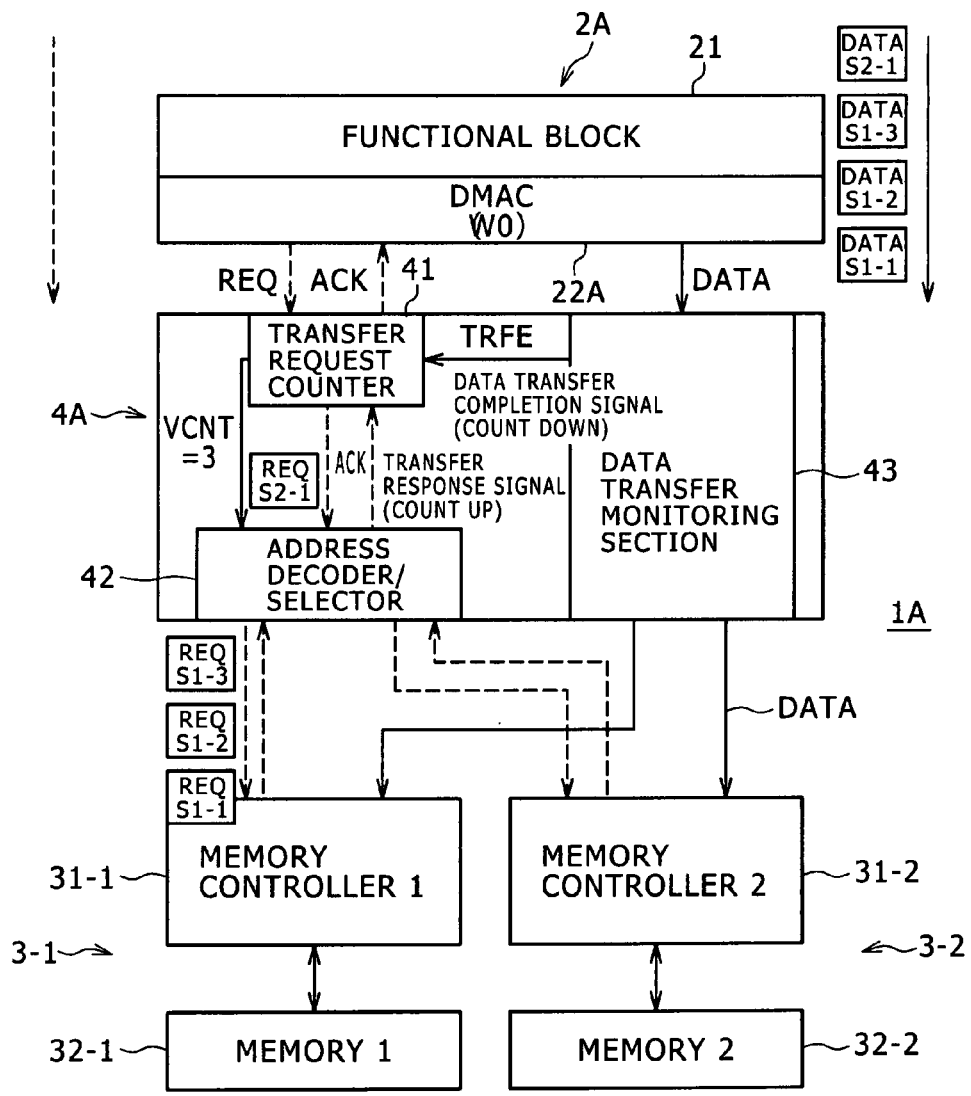
FIG. 14 is a diagram for explaining the operation of the second embodiment, illustrating a state in which a transfer request signal to a different slave device has been blocked.
Figure 15:
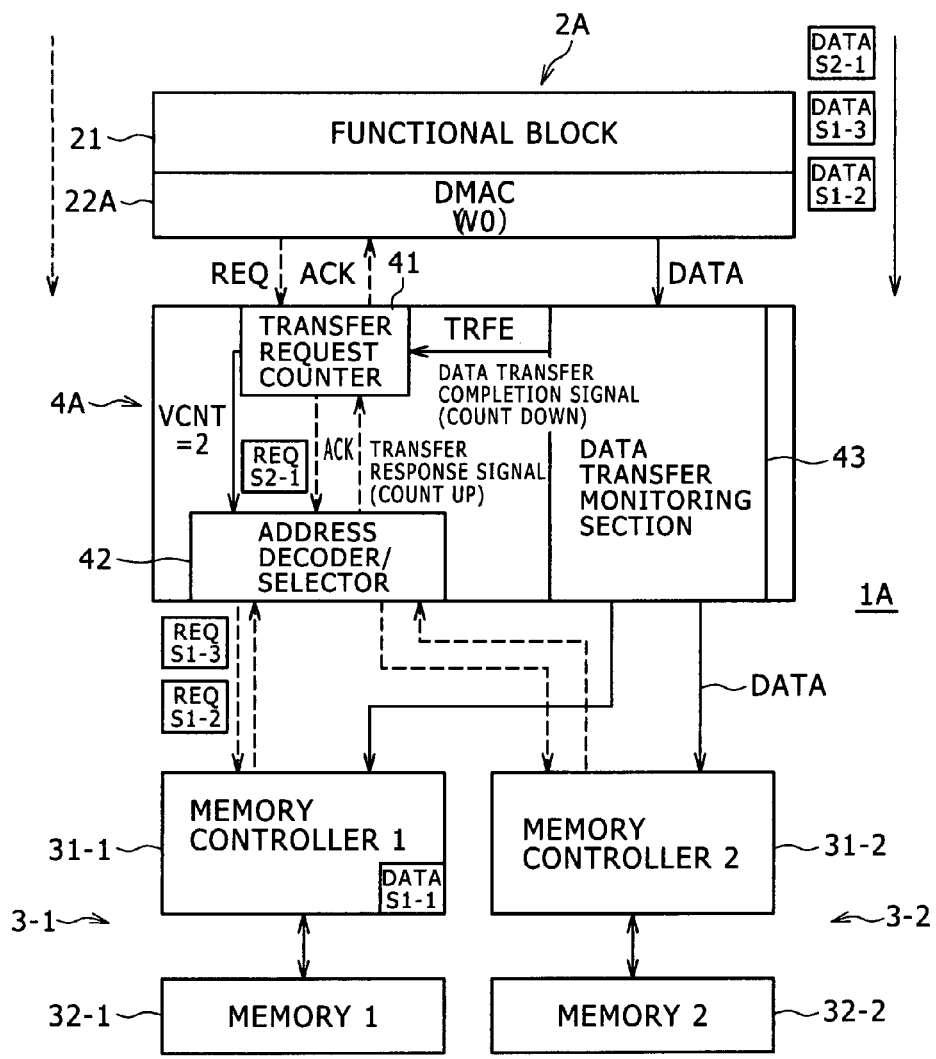
FIG. 15 is a diagram for explaining the operation of the second embodiment, illustrating a state in which the count value of the transfer request counter has decreased from 3 to 2.
Figure 16:
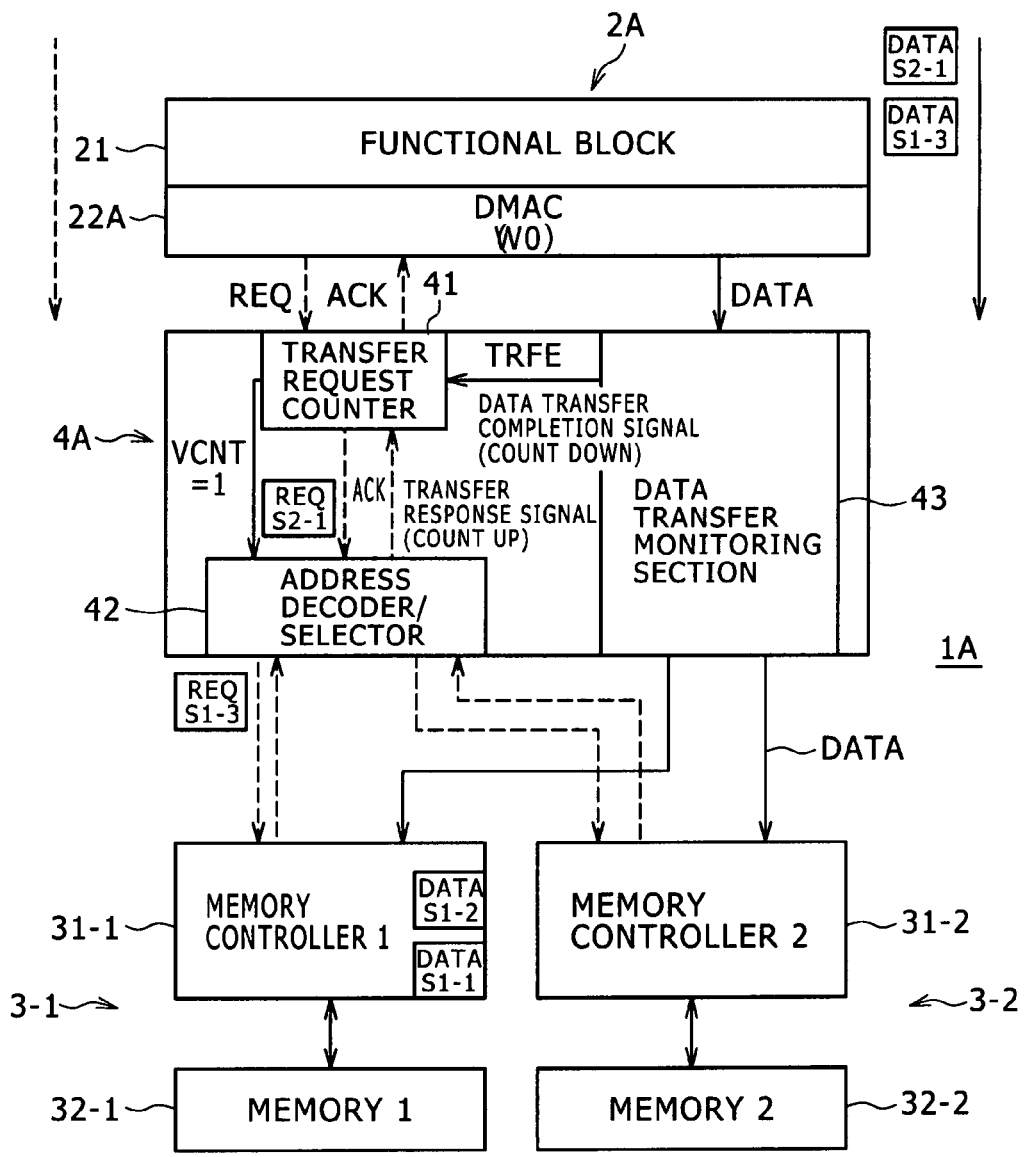
FIG. 16 is a diagram for explaining the operation of the second embodiment, illustrating a state in which the count value of the transfer request counter has decreased from 2 to 1.
Figure 17:
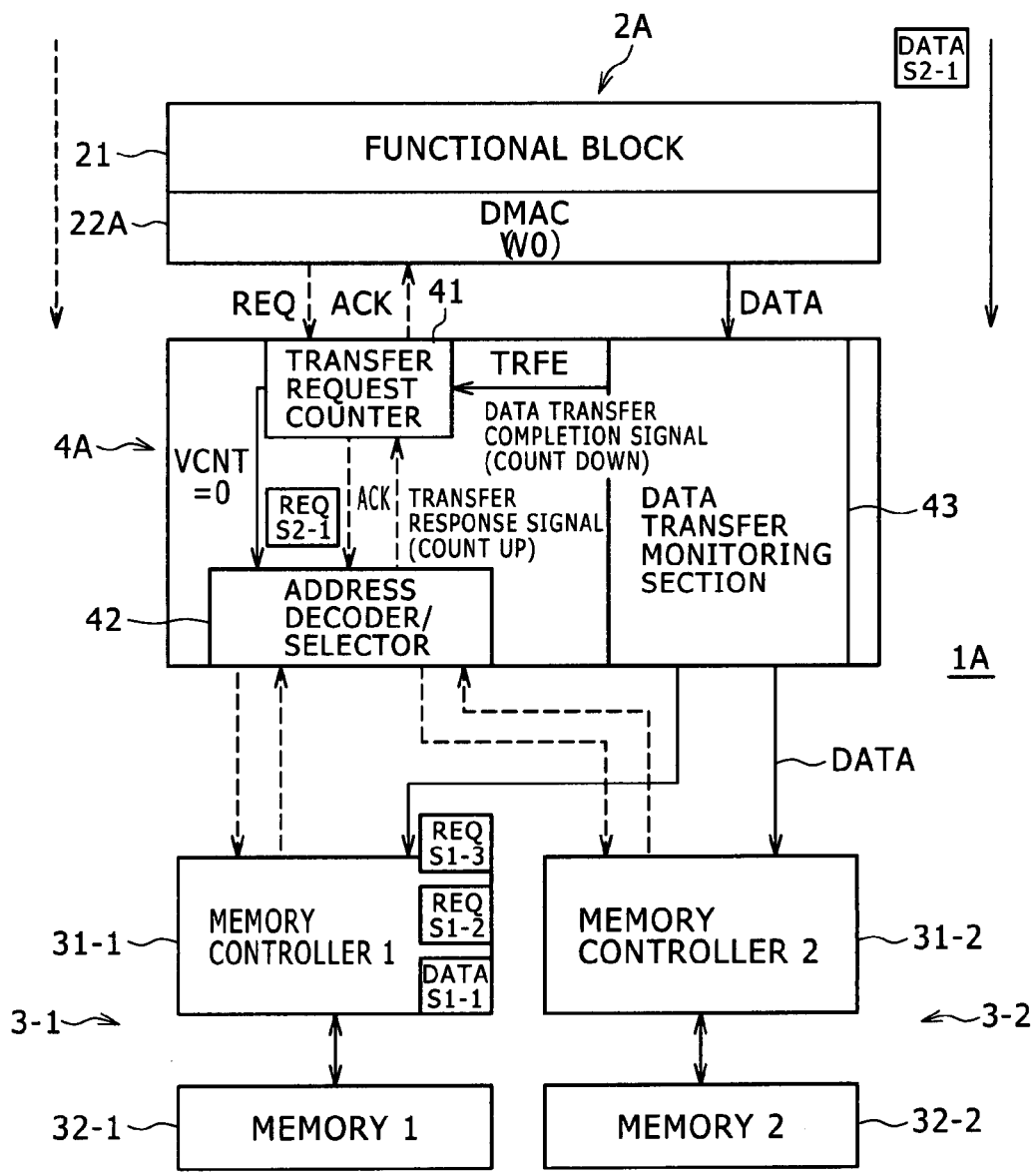
FIG. 17 is a diagram for explaining the operation of the second embodiment, illustrating a state in which the count value of the transfer request counter has decreased from 1 to 0.
Figure 18:
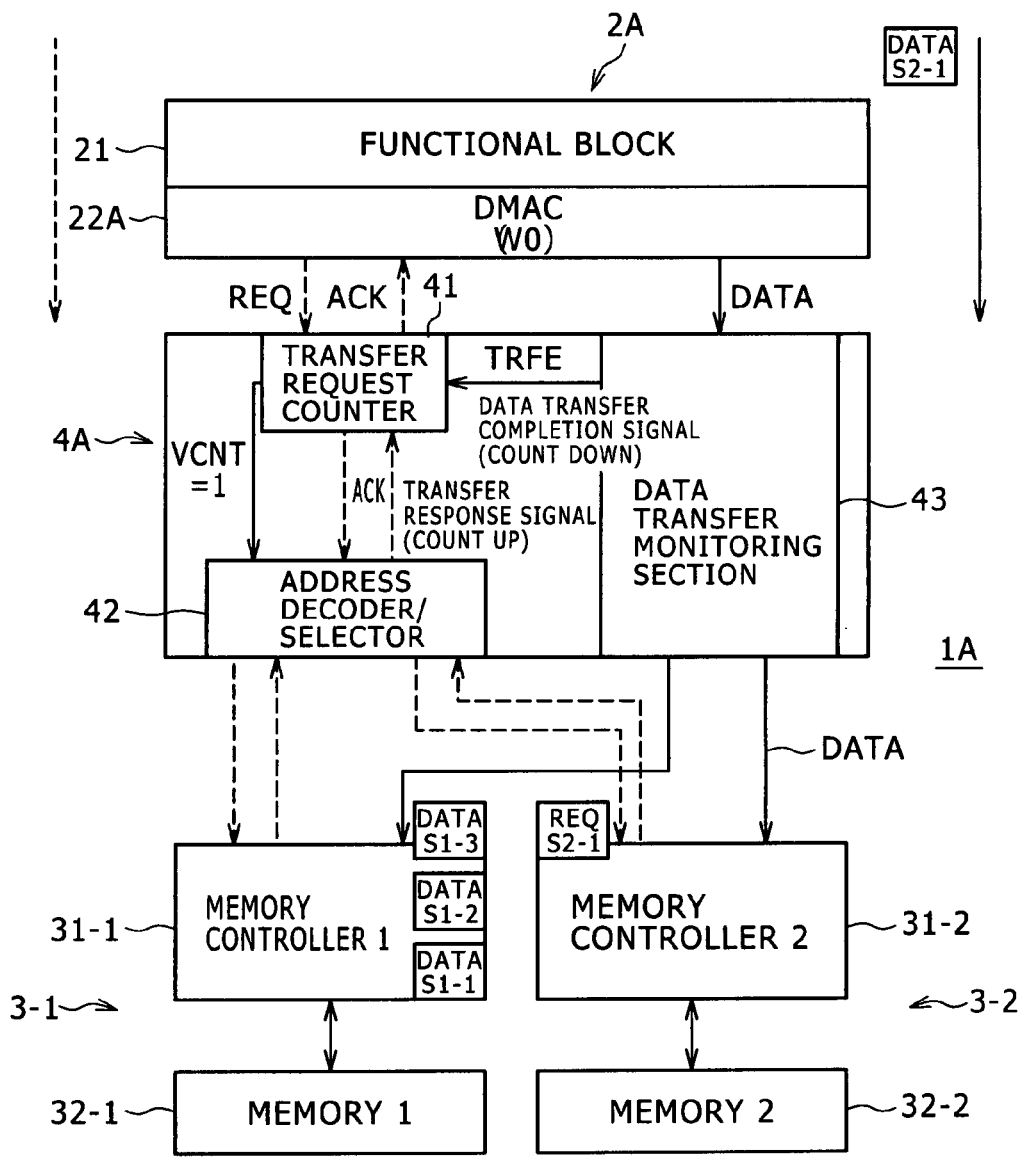
FIG. 18 is a diagram for explaining the operation of the second embodiment, illustrating a state in which the count value of the transfer request counter has increased from 0 to 1 as a result of output of the transfer request to the different slave device.
Figure 19:
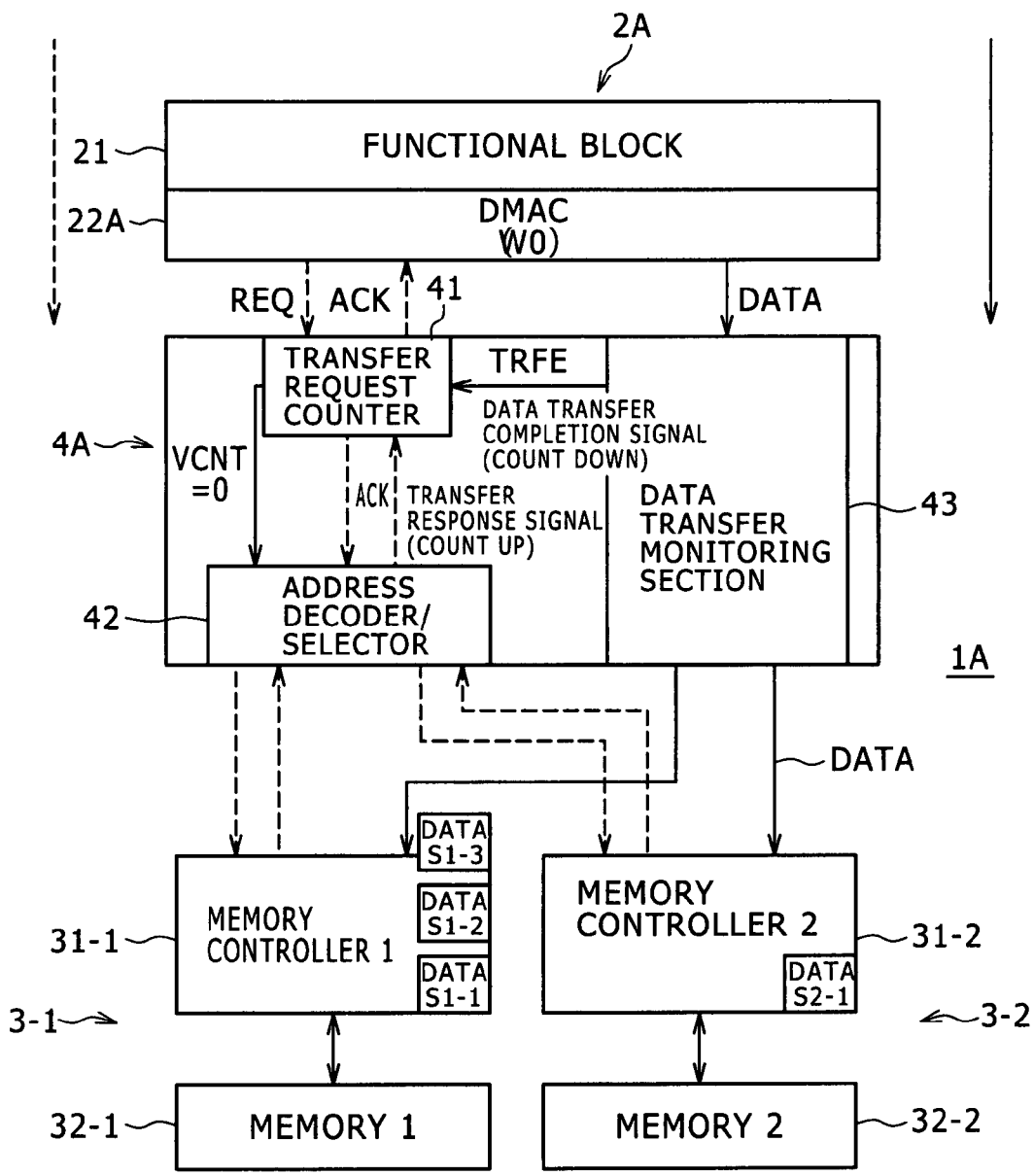
FIG. 19 is a diagram for explaining the operation of the second embodiment, illustrating a state in which the count value of the transfer request counter has decreased from 1 to 0.

FIG. 10 illustrates an initial state in which the count value VCNT of the transfer request counter 41 is 0. FIG. 11 illustrates a state in which the count value VCNT of the transfer request counter 41 is 1. FIG. 12 illustrates a state in which the count value VCNT of the transfer request counter 41 is 2. FIG. 13 illustrates a state in which the count value VCNT of the transfer request counter 41 is 3. FIG. 14 illustrates a state in which the transfer request signal to a different slave device 3-2 has been blocked. FIG. 15 illustrates a state in which the count value VCNT of the transfer request counter 41 has decreased from 3 to 2. FIG. 16 illustrates a state in which the count value VCNT of the transfer request counter 41 has decreased from 2 to 1. FIG. 17 illustrates a state in which the count value VCNT of the transfer request counter 41 has decreased from 1 to 0. FIG. 18 illustrates a state in which the count value VCNT of the transfer request counter 41 has increased from 0 to 1 as a result of output of the transfer request to the different slave device. FIG. 19 illustrates a state in which the count value VCNT of the transfer request counter 41 has decreased from 1 to 0.

As illustrated in FIG. 10, the master device 2A outputs the transfer requests to a data transfer device 4A in the above-described order: "REQ:S1-1", then "REQ:S1-2", then "REQ:S1-3", and finally "REQ:S2-1".

At the time of issuance of the transfer request signal "REQ:S1-1", as the count value VCNT of the transfer request counter 41 is 0, the address decoder/selector 42 outputs the transfer request to the memory controller 31-1 of the slave device 3-1, and the transfer response is transferred from the memory controller 31-1 of the slave device 3-1 to the data transfer device 4A.

At this time, in the data transfer device 4A, the transfer response from the slave device 3-1 is inputted to the transfer request counter 41 via the address decoder/selector 42.

As a result, as illustrated in FIG. 11, the count value VCNT of the transfer request counter 41 becomes 1.

At the time of issuance of the transfer request signal "REQ: S1-2", the count value VCNT of the transfer request counter 41 is 1, but the destination of the transfer request to be outputted this time is the same as the destination of the previous transfer request, that is the slave device 3-1. Therefore, the address decoder/selector 42 outputs the transfer request to the memory controller 31-1 of the slave device 3-1, and the transfer response is transferred from the memory controller 31-1 of the slave device 3-1 to the data transfer device 4A.

At this time, in the data transfer device 4A, the transfer response from the slave device 3-1 is inputted to the transfer request counter 41 via the address decoder/selector 42.

As a result, as illustrated in FIG. 12, the count value VCNT of the transfer request counter 41 becomes 2.

At the time of issuance of the transfer request signal "REQ: S1-3", the count value VCNT of the transfer request counter 41 is 2, but the destination of the transfer request to be outputted this time is the same as the destination of the previous transfer request, that is the slave device 3-1. Therefore, the address decoder/selector 42 outputs the transfer request to the memory controller 31-1 of the slave device 3-1, and the transfer response is transferred from the memory controller 31-1 of the slave device 3-1 to the data transfer device 4A.

At this time, in the data transfer device 4A, the transfer response from the slave device 3-1 is inputted to the transfer request counter 41 via the address decoder/selector 42.

As a result, as illustrated in FIG. 13, the count value VCNT of the transfer request counter 41 becomes 3.

At the time of issuance of the transfer request signal "REQ: S2-1", the current count value VCNT of the transfer request counter 41 is not 0, and the destination of the transfer request to be outputted this time is the memory controller 31-2 of the slave device 3-2, which is different from the destination of the previous transfer request, that is the slave device 3-1. Therefore, as illustrated in FIG. 14, the transfer request signal "REQ: S2-1" is blocked by the address decoder/selector 42 from being outputted to the slave device 3-2.

As illustrated in FIG. 15, the write data "DATA:S1-1" corresponding to the transfer request signal "REQ:S1-1" is transferred from the master device 2A to the memory controller 31-1 of the slave device 3-1 via the data transfer monitoring section 43 of the data transfer device 4A.

Upon completion of the data transfer from the master device 2A to the slave device 3-1, the data transfer completion signal TRFE is outputted from the data transfer monitoring section 43 to the transfer request counter 41. As a result, the count value VCNT of the transfer request counter 41 decreases by one, so that the count value VCNT becomes 2.

In addition, the memory controller 31-1 accesses the memory 32-1 to write the data "DATA:S1-1" corresponding to the transfer request "REQ:S1-1" thereto.

Similarly, as illustrated in FIG. 16, the write data "DATA: S1-2" corresponding to the transfer request signal "REQ:S1-2" is transferred from the master device 2A to the memory controller 31-1 of the slave device 3-1 via the data transfer monitoring section 43 of the data transfer device 4A.

Upon completion of the data transfer from the master device 2A to the slave device 3-1, the data transfer completion signal TRFE is outputted from the data transfer monitoring section 43 to the transfer request counter 41. As a result, the count value VCNT of the transfer request counter 41 decreases by one, so that the count value VCNT becomes 1.

In addition, the memory controller 31-1 accesses the memory 32-1 to write the data "DATA:S1-2" corresponding to the transfer request "REQ:S1-2" thereto.

Similarly, as illustrated in FIG. 17, the write data "DATA: S1-3" corresponding to the transfer request signal "REQ:S1-3" is transferred from the master device 2A to the memory controller 31-1 of the slave device 3-1 via the data transfer monitoring section 43 of the data transfer device 4A.

Upon completion of the data transfer from the master device 2A to the slave device 3-1, the data transfer completion signal TRFE is outputted from the data transfer monitoring section 43 to the transfer request counter 41. As a result, the count value VCNT of the transfer request counter 41 decreases by one, so that the count value VCNT becomes 0.

In addition, the memory controller 31-1 accesses the memory 32-1 to write the data "DATA:S1-3" corresponding to the transfer request "REQ:S1-3" thereto.

When, as illustrated in FIG. 17, the count value VCNT of the transfer request counter 41 of the data transfer device 4A becomes 0 as a result of the transfer of the write data "DATA: S1-3" from the master device 2A to the memory controller 31-1 of the slave device 3-1, the address decoder/selector 42 becomes able to select either of the slave devices 3-1 and 3-2. At this point, the transfer request signal "REQ:S2-1" is outputted to the memory controller 31-2 of the slave device 3-2.

Then, the transfer response is transferred from the memory controller 31-2 of the slave device 3-2 to the data transfer device 4A.

At this time, in the data transfer device 4A, the transfer response from the slave device 3-2 is inputted to the transfer request counter 41 via the address decoder/selector 42.

As a result, as illustrated in FIG. 18, the count value VCNT of the transfer request counter 41 becomes 1.

As illustrated in FIG. 19, the write data "DATA:S2-1" corresponding to the transfer request signal "REQ:S2-1" is transferred from the master device 2A to the memory controller 31-2 of the slave device 3-2 via the data transfer monitoring section 43 of the data transfer device 4A.

Upon completion of the data transfer from the master device 2A to the slave device 3-2, the data transfer completion signal TRFE is outputted from the data transfer monitoring section 43 to the transfer request counter 41. As a result, the count value VCNT of the transfer request counter 41 decreases by one, so that the count value VCNT becomes 0.

In addition, the memory controller 31-2 accesses the memory 32-2 to write the data "DATA:S2-1" corresponding to the transfer request "REQ:S2-1" thereto.

The above-described operation enables the master to issue the transfer requests in succession without regard to any slave while maintaining the order of the transfer requests and the order of the data.

As described above, in the second embodiment, similar to the reading operation of the first embodiment, the write-type transfer requests to one slave device are outputted in succession and, after the corresponding data transfers are completed, the write-type transfer request to a different slave device is outputted. This arrangement realizes efficient data transfer while maintaining the order of the responses.

Third Embodiment

Figure 20:
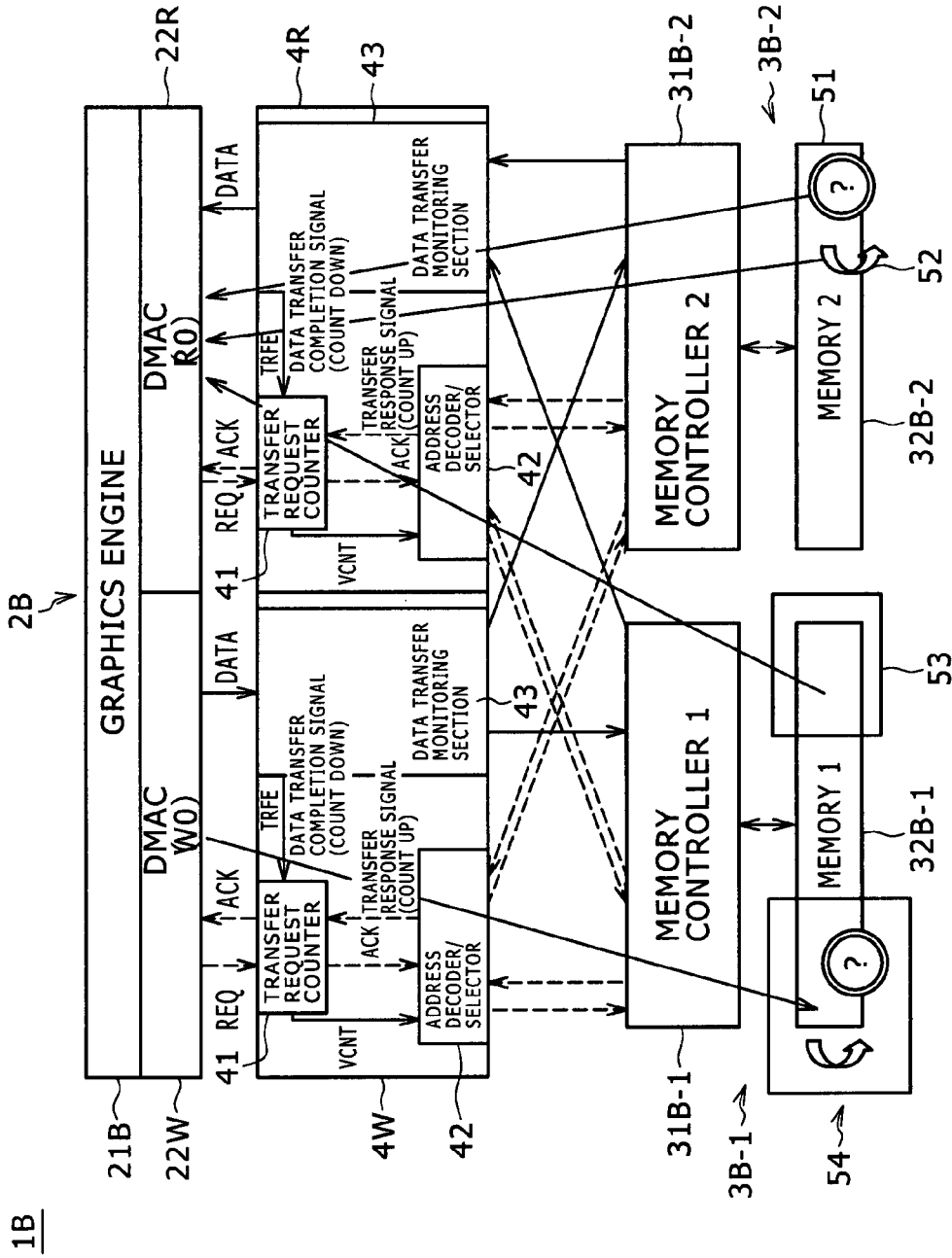
FIG. 20 is a diagram illustrating an exemplary configuration of a data transfer system according to a third embodiment of the present invention.

FIG. 20 is a diagram illustrating an exemplary configuration of a data transfer system 1B according to a third embodiment of the present invention.

The data transfer system according to the third embodiment is formed as a system that combines the functions of the read-type first embodiment and the write-type second embodiment. In the third embodiment, a functional block of a master device 2B is formed by a graphics engine that carries out composite imaging such as rendering.

In FIG. 20, the data transfer system 1B includes the master device 2B, slave devices 3B-1 and 3B-2, a first data transfer device 4R, and a second data transfer device 4W. The first data transfer device 4R is of the read type, and the second data transfer device 4W is of the write type.

The master device 2B includes a graphics engine 21B, a read-type DMAC (R0) 22R, and a write-type DMAC (W0) 22W.

The structures and functions of the master device 2B, the slave devices 3B-1 and 3B-2, the read-type data transfer device 4R, and the write-type data transfer device 4W are significantly the same as those as described above with respect to the first and second embodiments, and therefore, a detailed explanation thereof is omitted.

In the data transfer system 1B of FIG. 20, with the help of the data transfer control functions of the read-type DMAC 22R, the first data transfer device 4R, a memory controller 31B-1 of the slave device 3B-1, and a memory controller 31B-2 of the slave device 3B-2, the graphics engine 21B of the master device 2B, for example, generates a composite image while reading icons 51 and 52 stored in a memory 32B-2 of the slave device 3B-2 and a background 53 stored in a memory 32B-1 of the slave device 3B-1 as necessary.

Then, with the help of the data transfer control functions of the write-type DMAC 22W, the second data transfer device 4W, and the memory controller 31B-1 of the slave device 3B-1, the graphics engine 21B of the master device 2B stores the composite image 54 in the memory 32B-1 of the slave device 3B-1.

According to the third embodiment, the graphics engine 21B of the master device 2B is capable of issuing the transfer requests in succession without regard to a response characteristic of any memory while maintaining the order of the data transfer.

Fourth Embodiment

Figure 21:
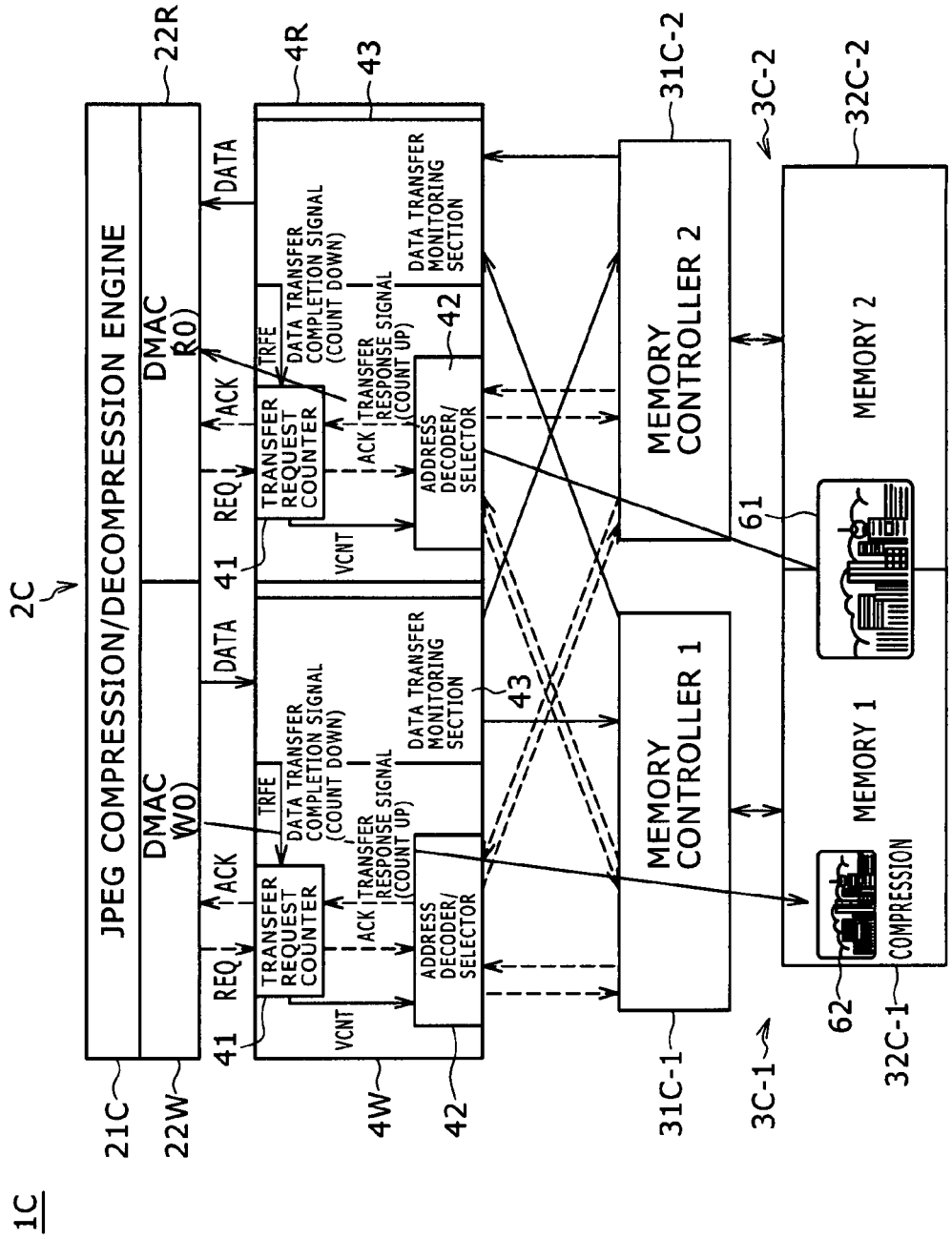
FIG. 21 is a diagram illustrating an exemplary configuration of a data transfer system according to a fourth embodiment of the present invention.

FIG. 21 is a diagram illustrating an exemplary configuration of a data transfer system according to a fourth embodiment of the present invention.

A data transfer system 1C according to the fourth embodiment is different from the data transfer system 1B according to the third embodiment in that the functional block of a master device 2C is formed by a JPEG compression/decompression engine 21C instead of the graphics engine.

In the other structural respects, the fourth embodiment is significantly the same as the third embodiment.

In the data transfer system 1C of FIG. 21, with the help of the data transfer control functions of the read-type DMAC 22R, the first data transfer device 4R, a memory controller 31C-1 of a slave device 3C-1, and a memory controller 31C-2 of a slave device 3C-2, the JPEG compression/decompression engine 21C of the master device 2C, for example, carries out an image compression process according to the JPEG standard while reading an image 61 that is mapped on consecutive addresses so as to extend over a memory 32C-1 of the slave device 3C-1 and a memory 32C-2 of the slave device 3C-2.

Then, with the help of the data transfer control functions of the write-type DMAC 22W, the second data transfer device 4W, and the memory controller 31C-1 of the slave device 3C-1, the JPEG compression/decompression engine 21CB of the master device 2C stores a resultant compressed image 62 on the memory 32C-1 of the slave device 3C-1.

In addition, with the help of the data transfer control functions of the read-type DMAC 22R, the first data transfer device 4R, and the memory controller 31C-1 of the slave device 3C-1, the JPEG compression/decompression engine 21C of the master device 2C, as necessary, reads the compressed image 62 stored in the memory 32C-1 of the slave device 3C-1 and performs an image decompression process according to the JPEG standard on the compressed image 62, and transfers the resultant image to a processor (not shown), for example.

According to the fourth embodiment, the JPEG compression/decompression engine 21C of the master device 2C is capable of issuing the transfer requests in succession without regard to the response characteristic of any memory while maintaining the order of the data transfer.

Note that, in the above-described embodiments, the transfer request counter of the data transfer device counts up for each input of the transfer request and counts down for each input of the data transfer completion signal. However, the transfer request counter may count down for each input of the transfer request and count up for each input of the data transfer completion signal. This arrangement also produces similar beneficial effects to those of the above-described embodiments.

It should be understood by those skilled in the art that various modifications, combinations, sub-combinations and alterations may occur depending on designs and other factors insofar as they are within the scope of the appended claims or the equivalents thereof.

The invention claimed is:

1. A data transfer device to which a master device capable of issuing a plurality of transfer requests and a plurality of slave devices each having a function of responding to the transfer request are connected, said data transfer device comprising:

a transfer request counter configured to count up or count down each time a response signal responding to the transfer request issued from the master device is inputted thereto from any one of the plurality of slave devices, and count down or count up each time a data transfer completion signal is inputted thereto;

a transfer destination selector configured to, based on a count value of said transfer request counter and information concerning a transfer-target slave device, determine and select one of the plurality of slave devices as a destination of the transfer request, and connect the master device with the selected slave device to enable data transfer therebetween; and a data transfer monitoring section configured to monitor completion of data transfer corresponding to the transfer request issued by the master device and, upon recognizing the completion thereof, output the data transfer completion signal to said transfer request counter, when the count value is the same as a predetermined initial value the selector may select any of the slave devices, when the count value is not the same as the predetermined initial value the selector may select only a current slave device.

2. The data transfer device according to claim 1, wherein the predetermined initial value is zero "0".

3. The data transfer device according to claim 1,
wherein the transfer requests issued by the master device are requests for reading and transferring data from the plurality of slave devices, and
upon recognizing that data read from any one of the plurality of slave devices in response to any one of the transfer requests has been transferred to the master device, said data transfer monitoring section outputs the data transfer completion signal to said transfer request counter.

4. The data transfer device according to claim 1,
wherein the transfer requests issued by the master device are requests for transferring and writing data to the plurality of slave devices, and
upon recognizing that data to be written to any one of the plurality of slave devices in response to any one of the transfer requests has been transferred to the slave device, said data transfer monitoring section outputs the data transfer completion signal to said transfer request counter.

5. A data transfer system, comprising:
a master device capable of issuing a plurality of transfer requests;
a plurality of slave devices each having a function of responding to the transfer request; and
a data transfer device to which said master device and said plurality of slave devices are connected;
wherein said data transfer device includes
a transfer request counter configured to count up or count down each time a response signal responding to the transfer request issued from said master device is inputted thereto from any one of said plurality of slave devices, and count down or count up each time a data transfer completion signal is inputted thereto,
a transfer destination selector configured to, based on a count value of the transfer request counter and information concerning a current transfer-target slave device, determine and select one of said plurality of slave devices as a destination of the transfer request, and connect said master device with said selected slave device to enable data transfer therebetween, and
a data transfer monitoring section configured to monitor completion of data transfer corresponding to the transfer request issued by said master device and, upon recognizing the completion thereof, output the data transfer completion signal to the transfer request counter,
when the count value is the same as a predetermined initial value the selector may select any of the slave devices, when the count value is not the same as the predetermined initial value the selector may select only a current slave device.

6. The data transfer system according to claim 5,
wherein the transfer requests issued by said master device are requests for reading and transferring data from said plurality of slave devices, and
upon recognizing that data read from any one of said plurality of slave devices in response any to one of the transfer requests has been transferred to said master device, the data transfer monitoring section outputs the data transfer completion signal to the transfer request counter.

7. The data transfer system according to claim 5,
wherein the transfer requests issued by said master device are requests for transferring and writing data to said plurality of slave devices, and
upon recognizing that data to be written to any one of said plurality of slave devices in response to any one of the transfer requests has been transferred to said slave device, the data transfer monitoring section outputs the data transfer completion signal to the transfer request counter.

8. A data transfer system, comprising:
a master device capable of issuing a plurality of transfer requests;
a plurality of slave devices each having a function of responding to the transfer request and including a data storage section; and
first and second data transfer devices to which said master device and said plurality of slave devices are connected;
wherein the plurality of transfer requests issued by said master device are each either a request for reading and transferring data from the data storage section of one of said plurality of slave devices or a request for transferring data to one of said plurality of slave devices and writing the data to the data storage section of said slave device, and
each of said first and second data transfer devices includes
a transfer request counter configured to count up or count down each time a response signal responding to the transfer request issued from said master device is inputted thereto from any one of said plurality of slave devices, and count down or count up each time a data transfer completion signal is inputted thereto,
a transfer destination selector configured to, based on a count value of the transfer request counter and information concerning a current transfer-target slave device, determine and select one of said plurality of slave devices as a destination of the transfer request, and connect said master device with said selected slave device to enable data transfer therebetween, and
a data transfer monitoring section configured to monitor completion of data transfer corresponding to the transfer request issued by said master device and, upon recognizing the completion thereof, output the data transfer completion signal to the transfer request counter,
when the count value is the same as a predetermined initial value the selector may select any of the slave devices, when the count value is not the same as the predetermined initial value the selector may select only a current slave device.

9. The data transfer system according to claim 8,
wherein upon recognizing that data read from any one of said plurality of slave devices in response to any one of the transfer requests has been transferred to said master device, the data transfer monitoring section of said first data transfer device outputs the data transfer completion signal to the transfer request counter, and
upon recognizing that data to be written to the data storage section of any one of said plurality of slave devices in response to any one of the transfer requests has been transferred to said slave device, the data transfer monitoring section of said second data transfer device outputs the data transfer completion signal to the transfer request counter.

* * * * *